US012601449B2

(12) United States Patent
Dethlefsen et al.

(10) Patent No.: US 12,601,449 B2
(45) Date of Patent: Apr. 14, 2026

(54) METHODS FOR ASSEMBLING A MULTI-CONIC PREFORM AND MANUFACTURING A SEMI-ELLIPSOIDAL SHELL USING THE MULTI-CONIC PREFORM

(71) Applicant: STOKE Space Technologies, Inc., Kent, WA (US)

(72) Inventors: Matthew Michael Dethlefsen, Normandy Park, WA (US); Michael Smith Brendel, Snoqualmie, WA (US); William Thomas Johnson, IV, Kent, WA (US)

( * ) Notice: Subject to any disclaimer, the term of this patent is extended or adjusted under 35 U.S.C. 154(b) by 0 days.

(21) Appl. No.: 18/742,939

(22) Filed: Jun. 13, 2024

(65) Prior Publication Data

US 2024/0353063 A1 Oct. 24, 2024

Related U.S. Application Data

(63) Continuation of application No. PCT/US2023/020269, filed on Apr. 27, 2023.

(Continued)

(51) Int. Cl.
F17C 1/14 (2006.01)
B64G 1/40 (2006.01)

(52) U.S. Cl.
CPC .............. F17C 1/14 (2013.01); B64G 1/4021 (2023.08); *F17C 2201/0128* (2013.01);

(Continued)

(58) Field of Classification Search
CPC ................ F17C 1/14; F17C 2201/0128; F17C 2201/0133; F17C 2201/0142;

(Continued)

(56) References Cited

U.S. PATENT DOCUMENTS 2,363,992 A 11/1944 Reiser
2,496,626 A * 2/1950 Jackson ................. B65D 88/04
428/580

(Continued)

FOREIGN PATENT DOCUMENTS

DE 19811045 A1 7/1999

OTHER PUBLICATIONS

Jian Zhang, Mingqiang Dai, Fang Wang, Wenxian Tang, Xilu Zhao, Buckling performance of egg-shaped shells fabricated through free hydroforming, International Journal of Pressure Vessels and Piping, vol. 193, 2021, 104435, ISSN 0308 0161.

(Continued)

*Primary Examiner* — Lawrence Averick
(74) *Attorney, Agent, or Firm* — Patrick D. Duplessis

(57) ABSTRACT

A semi-ellipsoidal, semi-toroidal, or toroidal shell includes an annular sheet metal wall that is longitudinally segmented so as to include a plurality of annular wall segments. Each of the plurality of annular wall segments is joined to an adjacent wall segment by a respective latitudinal wall weld. Also disclosed is a tank including the shell, a vehicle including the shell, a multi-conic preform used to manufacture the shell, a method for assembling the preform, and a method for manufacturing the shell using the preform.

22 Claims, 19 Drawing Sheets

Related U.S. Application Data

(60) Provisional application No. 63/384,175, filed on Nov. 17, 2022, provisional application No. 63/367,004, filed on Jun. 24, 2022, provisional application No. 63/363,867, filed on Apr. 29, 2022.

(52) U.S. Cl.
CPC ................ *F17C 2201/0133* (2013.01); *F17C 2201/0142* (2013.01); *F17C 2203/0643* (2013.01); *F17C 2270/0197* (2013.01)

(58) Field of Classification Search
CPC ...... F17C 2203/0643; F17C 2270/0197; F17C 2203/0646; F17C 2203/0648; B64G 1/4021; B64G 1/4022; B23K 2101/12; B23K 2103/04
See application file for complete search history.

(56) References Cited

U.S. PATENT DOCUMENTS

| | | | |
|---|---|---|---|
| 2,579,646 A | 12/1951 | Branson | |
| 3,945,236 A * | 3/1976 | Hooper | B23K 7/005 |
| | | | 72/340 |
| 3,946,236 A | 3/1976 | Roberts et al. | |
| 4,106,423 A | 8/1978 | Glasfeld | |
| 4,181,235 A | 1/1980 | Baysinger | |
| 4,441,925 A | 4/1984 | Ishizuka | |
| 5,723,742 A * | 3/1998 | Nykaza | A01H 5/10 |
| | | | 800/312 |
| 6,107,596 A | 8/2000 | Semenov | |
| 10,449,633 B1 | 10/2019 | Yuan et al. | |
| 2010/0000279 A1 | 1/2010 | Michel et al. | |
| 2010/0213244 A1 | 8/2010 | Miryekta et al. | |
| 2017/0036782 A1 | 2/2017 | Dula | |
| 2020/0189035 A1* | 6/2020 | von der Heydt | B23K 35/3066 |

OTHER PUBLICATIONS

Zheng, J, Guo, A, Miao, C, Xu, P, Yang, J, Ye, J, Ma, L, Wu, L, & Yang, G. "Cold Stretching of Cryogenic Pressure Vessels From Austenitic Stainless Steels." Proceedings of the ASME 2011 Pressure Vessels and Piping Conference. vol. 1: Codes and Standards. Baltimore, Maryland, USA. Jul. 17-21, 2011. pp. 693-698. ASME.

Faure, A. and Gourgeon, L., "SM98-128/264 Cryoformed Stainless Steel Pressure Vessels for Space Applications", in <i>Spacecraft Structures, Materials and Mechanical Testing</i>, 1999, vol. 428, p. 201.

Shijian Yuan, Fundamentals and Processes of Fluid Pressure Forming Technology for Complex Thin-Walled Components, Engineering, vol. 7, Issue 3, 2021, pp. 358-366, ISSN 2095-8099.

Lu, Y.Q. & Hui, Hu. (2015). Investigation on Mechanical Behaviors of Cold Stretched and Cryogenic Stretched Austenitic Stainless Steel Pressure Vessels. Procedia Engineering. 130. 628-637. 10.1016/j.proeng.2015.12.282.

Cui X, Ziqin Y, Baoguo C, et al. Large Ellipsoid Parts Manufacture Using Electromagnetic Incremental Forming With Variable Blankholder Structure. Research Square; 2021. DOI: 10.21203/rs.3.rs-308311/v1.

Mechanics of Sheet Metal Forming, Second Edition, J. L. Duncan, Jack Hu, Zdzislaw Marciniak, Published by Butterworth-Heinemann,, 2002, ISBN 10: 0750653000 / ISBN 13: 9780750653008.

Neto, D.M., Oliveira, M.C., Dick, R.E. et al. Numerical and experimental analysis of wrinkling during the cup drawing of an AA5042 aluminium alloy. Int J Mater Form 10, 125-138 (2017). https://doi.org/10.1007/s12289-015-1265-4.

Johnson, Theodore & Sleight, David & Martin, Robert. (2013). Structures and Design Phase I Summary for the NASA Composite Cryotank Technology Demonstration Project. 10.2514/6.2013-1825.

Qinglei Guo, Lihui Lang, Kui Li, Peicheng Jiang, Jun Jiang, Li Zhang, Research on the hydroforming regularity and process optimization control of complex aluminum alloy part with variable cross-section size, Procedia Manufacturing, vol. 50, 2020, pp. 332-336, ISSN 2351-9789.

Zhang Wei, Teng Bu-gang, Research on Weld Seam Models for Hydro-forming of Ellipsoidal Shell, International Journal of Materials Engineering, Mar. 2017, vol. 45, No. 3, pp. 60-65, doi: 10. 11868/j. issn.1001-4381.2015.000098.

* cited by examiner

310

310

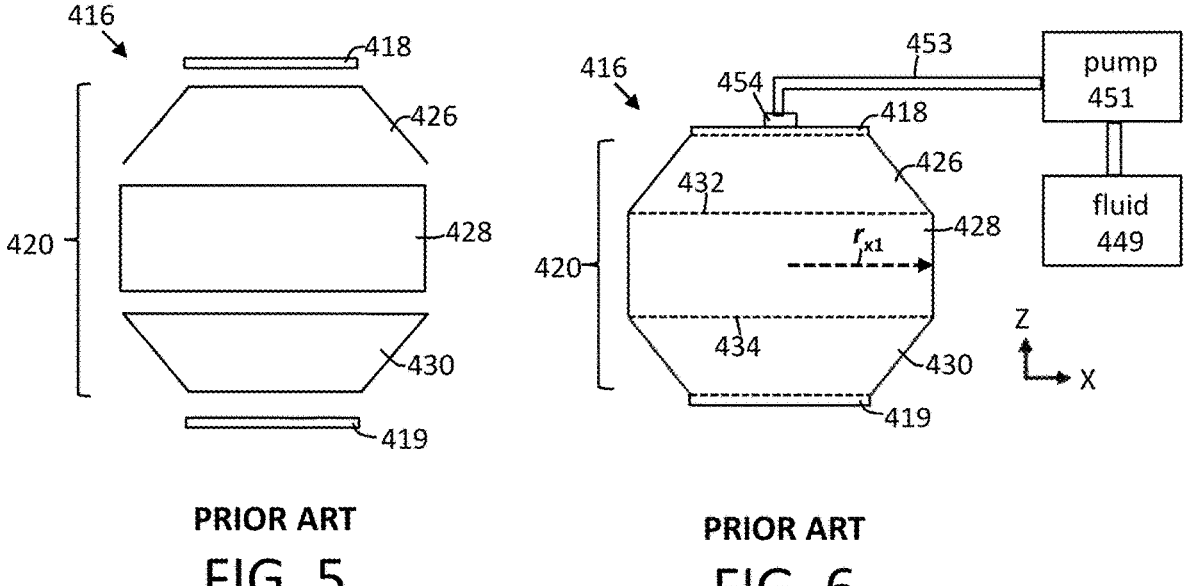
PRIOR ART
FIG. 5
PRIOR ART
FIG. 6
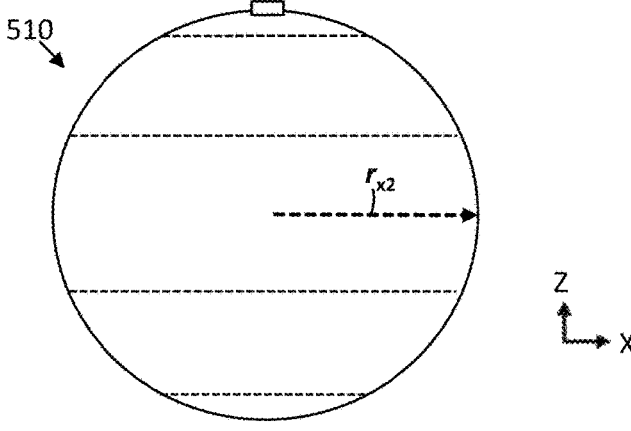
PRIOR ART
FIG. 7

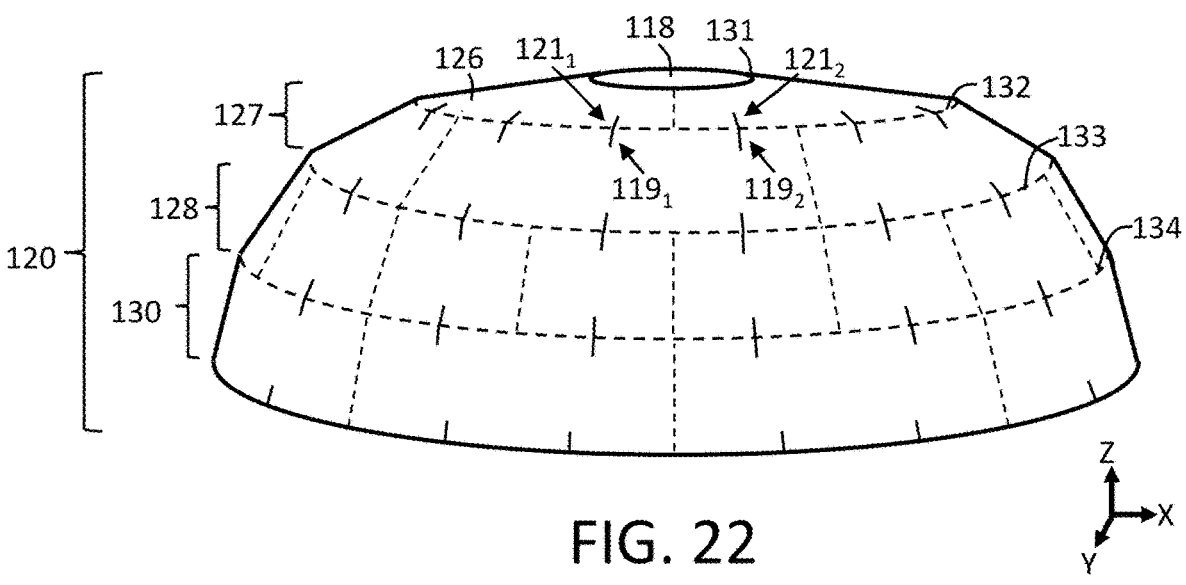
FIG. 22
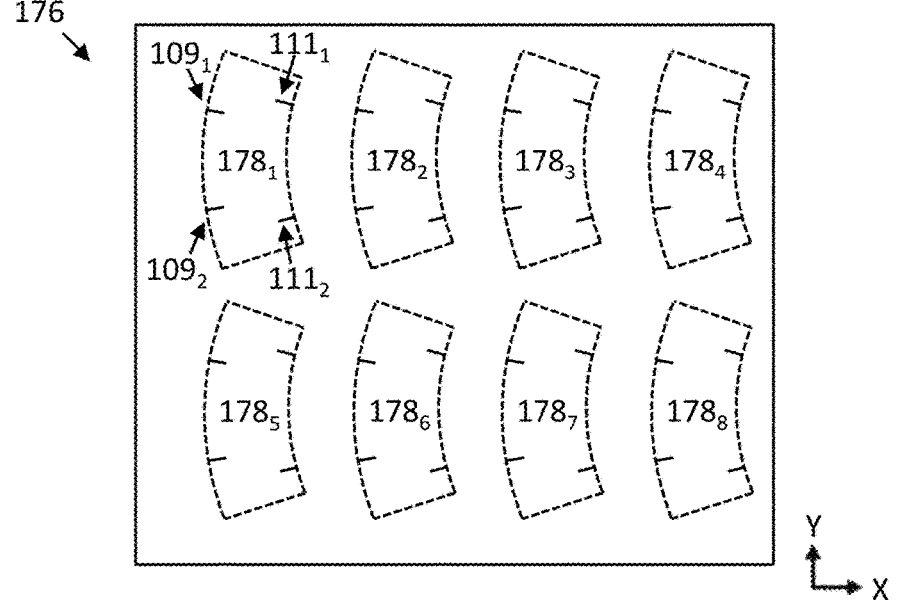
FIG. 23
FIG. 24

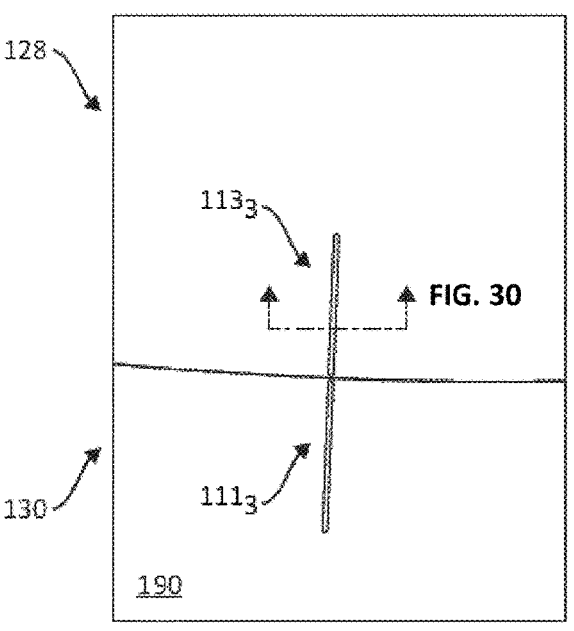
FIG. 29
FIG. 30
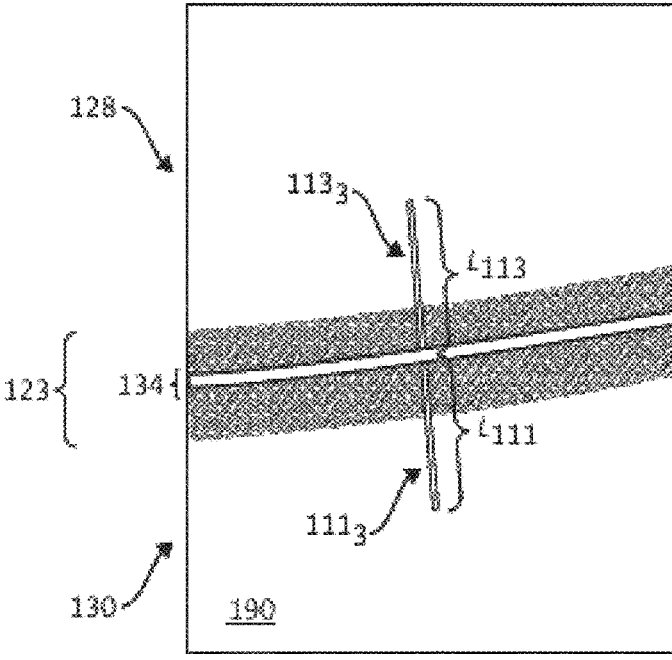
FIG. 31

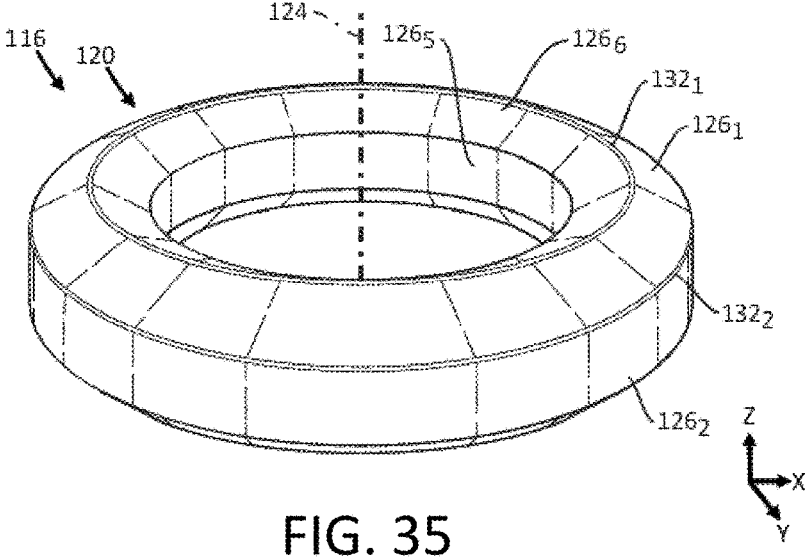
FIG. 35
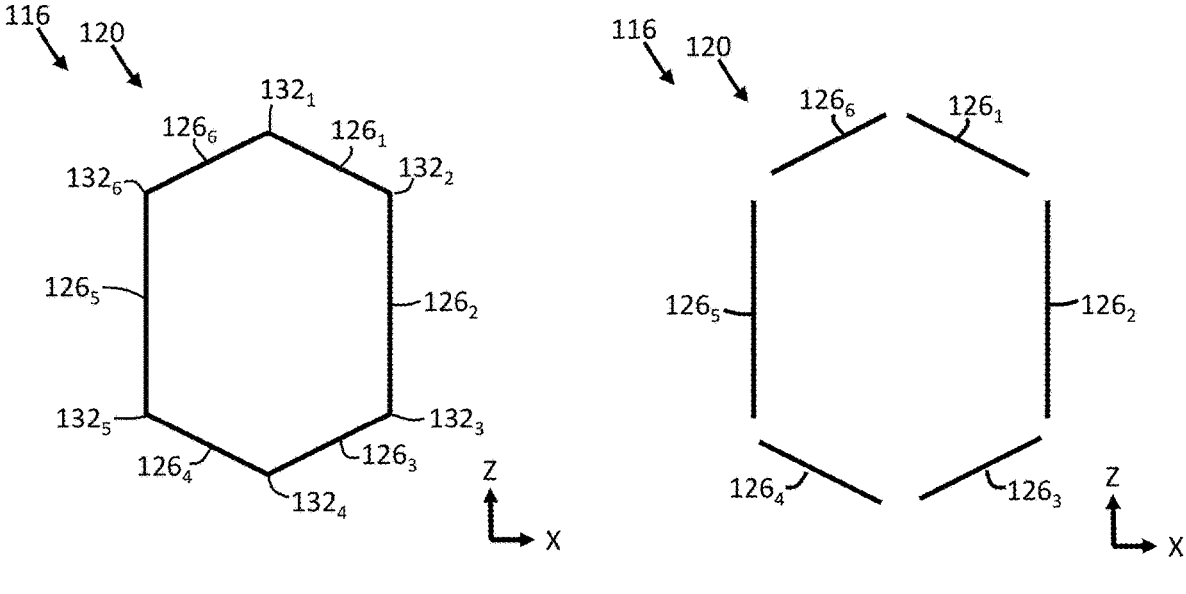
FIG. 36                    FIG. 37

METHODS FOR ASSEMBLING A MULTI-CONIC PREFORM AND MANUFACTURING A SEMI-ELLIPSOIDAL SHELL USING THE MULTI-CONIC PREFORM

CROSS-REFERENCE TO RELATED APPLICATIONS

This application is a Continuation of pending International Patent Application No. PCT/US2023/020269, filed on Apr. 27, 2023, which claims the benefit of priority to U.S. Provisional Patent Application No. 63/363,867, filed on Apr. 29, 2022, U.S. Provisional Patent Application No. 63/367, 004, filed on Jun. 24, 2022, and U.S. Provisional Patent Application No. 63/384,175, filed on Nov. 17, 2022, the contents of which are incorporated by reference herein in their entirety.

TECHNICAL FIELD

The present disclosure generally relates to welded metal components having thin-walled curved surfaces and methods for manufacturing the same. The present disclosure more particularly relates to a shell (e.g., semi-ellipsoidal shell, semi-toroidal shell, toroidal shell, etc.) formed from welded sheet metal components, a tank including the shell, a vehicle including the shell, a multi-conic preform used to manufacture the shell, a method for assembling the multi-conic preform, and a method for manufacturing the shell using the multi-conic preform.

BACKGROUND

Aircraft-like reusability for rockets has long been the "holy grail" of rocketry due to the potential for large cost benefits. The ability to recover and reuse all rocket stages of a multi-stage rocket system (e.g., the lower and upper stage rockets of a two-stage rocket system) remains a significant technical gap that has not yet been solved by the industry. Reusing the upper stage rocket of a multi-stage rocket system is particularly challenging due to the harsh re-entry environment and the performance penalties associated with increased structural mass required for withstanding the reentry environment and guiding the vehicle to a precise landing location. Upper stage rockets are typically constructed with the minimum structure and complexity since any mass addition to the second stage is a 1:1 reduction in payload capacity. Reusing an upper stage rocket therefore requires significant additional functionality but with minimal mass addition.

The quest to achieve aircraft-like reusability for rockets has prompted demand for a new generation of large, complex-shaped, and high performance components. In particular, a new generation of large, lightweight components with thin-walled curved surfaces are needed for many of the key structural components of a rocket, including the fuel tank, the nose at the forward end of the rocket, etc. There are several known techniques for manufacturing such components from metal alloys or other difficult-to-deform materials. Such techniques include: (1) forming several smaller-size components and then welding them together to make the large component; (2) performing metal shaping (e.g., spinning, stamping, forging, etc.) to make the large component as a seamless integral component; and (3) additively manufacturing (e.g., 3D printing) a large component as a seamless integral component. These techniques can require tooling (e.g., dies, machinery, etc.) that can be size- and/or cost-prohibitive, especially for newer entrants to the industry.

Fluid pressure forming techniques (e.g., hydroforming, cryoforming, etc.) were developed to manufacture large components with thin-walled curved surfaces without the need for dies or other large and/or costly tooling. Fluid pressure forming generally involves use of a fluid medium (e.g., water, oil, gas, liquified gas, etc.) to load and deform a workpiece. In some instances, the use of dies is partly or entirely eliminated by providing a preform that at least partially defines a cavity into which the fluid medium is introduced. The pressure of the fluid medium in the cavity is increased in a controlled manner until the preform plastically deforms and bulges to form a shell with a desired shape.

It is known to use fluid pressure forming techniques to manufacture large spherical and ellipsoidal shells. FIGS. 1-4, for example, illustrate several steps in the manufacture of a large ellipsoidal shell 310 (FIGS. 3-4) from a preform 216 (FIGS. 1-2) using fluid pressure forming. Referring to FIGS. 1 and 2, the preform 216 is formed from a plurality of sheet metal components that have been welded together. In particular, the preform 216 includes a domed cap 218, a domed base 219, and an annular wall 220 extending therebetween. Notably, the wall 220 is latitudinally segmented so as to include a plurality of wall gores $226_i$, each of which is joined to an adjacent wall gore $226_i$ by a respective longitudinal weld $246_i$. The cap 218, the base 219, and the wall 220 are shaped such that the preform 216 is a polyhedron. The cap 218, the base 219, and the wall 220 are sheet metal components that are each roll-bent or otherwise shaped before being assembled and welded together to make the preform 216. The preform 216 defines a closed internal cavity into which a fluid 249 (e.g., water) is injected via a pump 251, a hose 253, and a port 254 disposed relative to the cap 218. The pressure of the fluid medium within the preform cavity is increased in a controlled manner until the cap 218, the base 219, and the wall 220 plastically deform and bulge to form the shell 310 (FIGS. 3 and 4) having the desired ellipsoidal shape. As a result of the plastic deformity and bulging, the respective radii $r_{x2}$, $r_{z2}$ of the shell 310 along the major and minor axes 336, 324 (see FIG. 3) are greater than the corresponding radii $r_{x1}$, $r_{z1}$ of the preform 216 (see FIG. 1).

Fluid pressure forming techniques, such as the one shown in FIGS. 1-4, can be advantageous in that they avoid the need for dies and other large and costly tooling. However, there can be problems associated with such techniques. For example, it can be difficult to accurately and repeatably cut and bend the wall gores $226_i$ to their required shape, and it can be time consuming and difficult to precisely weld the wall gores $226_i$ to one another given the curvature of their edges.

In the context of spherical shells, it has been known to use a cylindrical wall segment and a upper and lower frusto-conical wall segments in lieu of wall gores like those in FIGS. 1 and 2. FIGS. 5-7, for example, illustrate several steps in the manufacturing of a large spherical shell 510 (FIG. 7) from a preform 416 (FIGS. 5 and 6) having a disc-shaped cap 418, a disc-shaped base 419, and an annular wall 420 extending therebetween. The cap 418, the base 419, and the wall 420 are sheet metal components that are shaped before being assembled and welded together to make the preform 416. The wall 420 is longitudinally segmented so as to include a plurality of wall segments 426, 428, 430, each of which is joined to an adjacent wall segment by a respective latitudinal (e.g., circumferential) weld 432, 434. The segments of the wall 420 include an upper frustoconical wall segment 426, a lower frustoconical wall segment 430, and a cylindrical wall segment 428 extending therebetween. The preform 416 defines a closed cavity into which a fluid 449 (e.g., water) is injected via a pump 451, a hose 453, and a port 454 disposed on the cap 418. The pressure of the fluid medium is increased in a controlled manner until the cap 418, the base 419, and the wall 420 plastically deform and bulge to form the shell 510 (FIG. 7) having the desired spherical shape. The plastic deformity and bulging causes the shell 510 to have a smoothly curved spherical shape and an internal cavity that is bigger than that of the preform 416. Notably, the radius $r_{x2}$ of the shell 510 (see FIG. 7) is greater than the largest radius $r_{x1}$ of the preform 416 (see FIG. 6).

Referring to FIGS. 5 and 6, the use of a longitudinally segmented wall 420, and especially the use of frustoconical and cylindrical wall segments 426, 428, 430, is advantageous in that it allows the preform 416 to be manufactured easier and faster, and in a more accurate and easily-repeatable manner, than preforms using the traditional gore-shaped wall segments (see FIGS. 1-2). However, to date, such techniques have been limited to use with preforms for spherical shells. This is because the plastic deformity and bulging experienced during fluid pressure forming are expected to cause unsightly and destabilizing deformities (e.g., wrinkles) in a shell having any non-spherical shape (e.g., ellipsoidal, semi-ellipsoidal, toroidal, semi-toroidal, etc.). The prior art specifically teaches away from using such techniques with performs for large non-spherical shells, due to difficulties in controlling the concentricity of wall segments, among other reasons.

Another advantage of fluid pressure forming processes is that the plastic deformation of sheet metal workpieces can achieve work hardening while retaining the characteristics of the workpiece. For example, a few percent deformation of an austenitic stainless steel workpiece will give a considerable and homogeneous yield strength improvement while simultaneously reducing the wall thickness of the workpiece. The plastic deformation causes the austenite structure of the steel to transform to the much stronger, less ductile martensite structure of steel.

It is known that the rate of work hardening (e.g., austenitic-to-martensitic transformation) can be increased by exposing the workpiece to cold temperatures during plastic deformation. Cryogenic stretching (or cryoforming) uses liquid nitrogen as a medium to extremely reduce the temperature of a workpiece during work hardening (e.g., reducing temperature to approximately −195° Celsius). However, the use of liquid nitrogen can be costly and can introduce logistical complications into the manufacturing process. Cold stretching (or cold forming) is a technique that is similar in principle to cryogenic stretching, but the cooling medium is water instead of liquid nitrogen. Cold stretching can be more affordable and less complicated than cryogenic stretching, but the work hardening results are inferior to cryogenic stretching because the temperatures are not nearly as low.

Aspects of the present invention are directed to these and other problems.

SUMMARY

According to an aspect of the present invention, a semi-ellipsoidal shell includes a cap, an annular wall, and a latitudinal cap weld joining the cap to the wall. The cap and the wall are sheet metal components. The wall is longitudinally segmented so as to include a plurality of annular wall segments. Each of the plurality of annular wall segments is joined to an adjacent wall segment by a respective latitudinal wall weld.

According to another aspect of the present invention, a tank includes a semi-ellipsoidal shell, and the shell includes a cap, an annular wall, and a latitudinal cap weld joining the cap to the wall. The cap and the wall are sheet metal components. The wall is longitudinally segmented so as to include a plurality of annular wall segments. Each of the plurality of annular wall segments is joined to an adjacent wall segment by a respective latitudinal wall weld.

According to another aspect of the present invention, a vehicle includes a semi-ellipsoidal shell, and the shell includes a cap, an annular wall, and a latitudinal cap weld joining the cap to the wall. The cap and the wall are sheet metal components. The wall is longitudinally segmented so as to include a plurality of annular wall segments. Each of the plurality of annular wall segments is joined to an adjacent wall segment by a respective latitudinal wall weld.

According to another aspect of the present invention, a multi-conic preform used to manufacture a semi-ellipsoidal shell. The preform includes a preform cap, a multi-conic preform wall, and a first latitudinal preform weld joining the preform cap to the preform wall. The preform cap and the preform wall are sheet metal components. The preform wall is longitudinally segmented so as to include a plurality of annular preform wall segments. Each of the plurality of annular preform wall segments is joined to an adjacent preform wall segment by a respective latitudinal preform wall weld.

According to another aspect of the present invention, a method for manufacturing a semi-ellipsoidal shell includes: providing the above-mentioned multi-conic preform; and performing a first fluid pressure forming step, during which an inner surface of the preform is exposed to a strengthening pressure that work hardens at least the preform cap and the preform wall.

According to another aspect of the present invention, a method for assembling a multi-conic preform includes: a method for assembling a multi-conic preform includes: providing first and second preform wall segments, each in the form of a frustoconical sheet metal component, the first preform wall segment having top edge alignment markings disposed relative to a top edge of the first preform wall segment, and the second preform wall segment having bottom edge alignment markings disposed relative to a bottom edge of the second preform wall segment; positionally fixing the first preform wall segment relative to the second preform wall segment such that the top edge alignment markings of the first preform wall segment are aligned with the bottom edge alignment markings of the second preform wall segment; and joining the top edge of the first preform wall segment to the bottom edge of the second preform wall segment via a first latitudinal weld.

According to another aspect of the present invention, a semi-toroidal or toroidal shell includes a plurality of annular wall segments and a plurality of latitudinal wall welds. Each of the plurality of annular wall segments is joined to an adjacent wall segment by a respective latitudinal wall weld. Each of the annular wall segments is a sheet metal component.

According to another aspect of the present invention, a multi-conic preform used to manufacture a semi-toroidal or toroidal shell includes a sheet metal preform wall. The preform wall is longitudinally segmented so as to include a plurality of annular preform wall segments. Each of the plurality of annular preform wall segments is joined to an adjacent preform wall segment by a respective latitudinal preform wall weld.

In addition to, or as an alternative to, one or more of the features described above, further aspects of the present invention can include one or more of the following features, individually or in combination:

the plurality of annular wall segments includes at least a top wall segment, a bottom wall segment, and a first latitudinal wall weld disposed therebetween;

the top wall segment is joined to the cap via the latitudinal cap weld, and the bottom wall segment defines a maximum radius of the shell in a direction of a second semi-axis perpendicular to the first semi-axis;

the plurality of annular wall segments includes at least one intermediate wall segment disposed between the top wall segment and the bottom wall segment;

each of the plurality of annular wall segments has a respective shape of a frustum of an ellipsoid;

the top wall segment has a first thickness and the bottom wall segment has a second thickness that is different than the first thickness;

the top wall segment has a first thickness and the bottom wall segment has a second thickness that is the same as the first thickness;

the top wall segment has a first thickness, the bottom wall segment has a second thickness, and the first and second thicknesses have different magnitudes;

the top wall segment has a first hardness and the bottom wall segment has a second hardness that is different than the first hardness;

each of the plurality of annular wall segments includes at least one longitudinal weld;

the plurality of annular wall segment includes at least a first wall segment that is latitudinally segmented into a plurality of sub-segments, and each of the plurality of sub-segments is joined to an adjacent sub-segment by a respective longitudinal weld;

the shell has a D/t ratio above 500, where D is a largest diameter of the shell and t is a thickness of at least one of the cap and the wall;

the cap and the wall are stainless steel sheet metal components;

the cap and the wall are martensitic stainless sheet metal components;

the cap and the wall are stretch hardened sheet metal components;

the cap is domed;

the cap and the wall are co-axially aligned relative to a first semi-axis of the shell;

the tank includes a port through which a fluid medium flows between an exterior of the tank and an interior cavity defined by the tank;

the semi-ellipsoidal shell included in the tank is a first semi-ellipsoidal shell, and the tank further includes a second semi-ellipsoidal shell joined to the first semi-ellipsoidal shell to provide the tank with a ellipsoidal shape;

the tank further includes a non-ellipsoidal shell joined to the semi-ellipsoidal shell;

the non-ellipsoidal shell included in the tank is a semi-spherical shell;

the vehicle is a rocket;

the preform cap is domed;

the preform cap is at least substantially flat;

each of the plurality of annular preform wall segments has a respective shape of a frustum of a cone;

the method further includes performing a second fluid pressure forming step, during which the inner surface of the preform is exposed to a design pressure that causes the preform to plastically deform and bulge so as to form the semi-ellipsoidal shell;

the method further includes an unloading step performed between the first and second fluid pressure forming steps, and during the unloading step the pressure applied to the inner surface of the preform is at least partially reduced;

the method further includes exposing the preform to cold temperatures during at least one of the first fluid pressure forming step and the second fluid pressure forming step;

the plastic deformation and bulging that occurs during the second pressure fluid pressure forming step causes at least one of the preform dome and the preform wall to form a wrinkle, and the second fluid pressure forming step includes exposing the inner surface of the preform to the design pressure for a predetermined period of time after the wrinkle has formed;

the positionally fixing step includes connecting the top edge of the first preform wall segment to the bottom edge of the second preform wall segment via a plurality of tack welds;

the joining step includes joining an entirety of the top edge of the first preform wall segment to the bottom edge of the second preform wall segment via a first latitudinal weld;

the first latitudinal weld is provided by a laser welder;

the joining step includes rotating the first and second preform wall segments on a rotary table while a stationary welder provides the first latitudinal weld;

the method for assembling the multi-conic preform further includes cutting a plurality of preform wall sub-segments from a sheet metal plate, and welding the plurality of preform wall sub-segments together to form the first preform wall segment;

the method for assembling the multi-conic preform further includes providing the top edge alignment markings at predetermined positions on the sheet metal plate before the step of cutting the plurality of preform wall sub-segments from the sheet metal plate; and the step of cutting the plurality of preform wall sub-segments from the sheet metal plate and the step of providing the top edge alignment markings at predetermined positions on the sheet metal plate are performed using a same laser cutter.

These and other aspects of the present invention will become apparent in light of the drawings and detailed description provided below.

BRIEF DESCRIPTION OF THE DRAWINGS

FIG. 5 is an exploded elevation view of another prior art preform made of welded sheet metal components.

FIG. 6 is an elevation view of the preform of FIG. 5.

FIG. 7 is an elevation view of a prior art spherical shell manufactured using the preform of FIGS. 5 and 6.

FIG. 22 is a perspective view of a multi-conic perform assembled from the preform wall segments of FIG. 21 together with a top preform wall segment and a preform cap.

FIG. 23 is a schematic plan view of a sheet metal plate from which a plurality of sub-segments of a preform wall segment are to be cut.

FIG. 24 is an elevation view of the sheet metal plate of FIG. 23.

FIG. 29 is an enlarged view of respective alignment marks of the preform wall segments of FIG. 20 before joining of the preform wall segments to one another via welding.

FIG. 30 is a cross-sectional view of the portion of the preform wall segment of FIG. 29.

FIG. 31 is an enlarged view showing respective alignment marks of the preform wall segments of FIG. 20 after joining of the preform wall segments to one another via welding.

FIG. 35 is a perspective view of the multi-conic preform used to manufacture the toroidal shell of FIGS. 33 and 34.

FIG. 36 is a schematic cross-sectional view of the preform of FIG. 35.

FIG. 37 is an exploded schematic cross-sectional view of the preform of FIG. 35.

DETAILED DESCRIPTION

Figure 32:
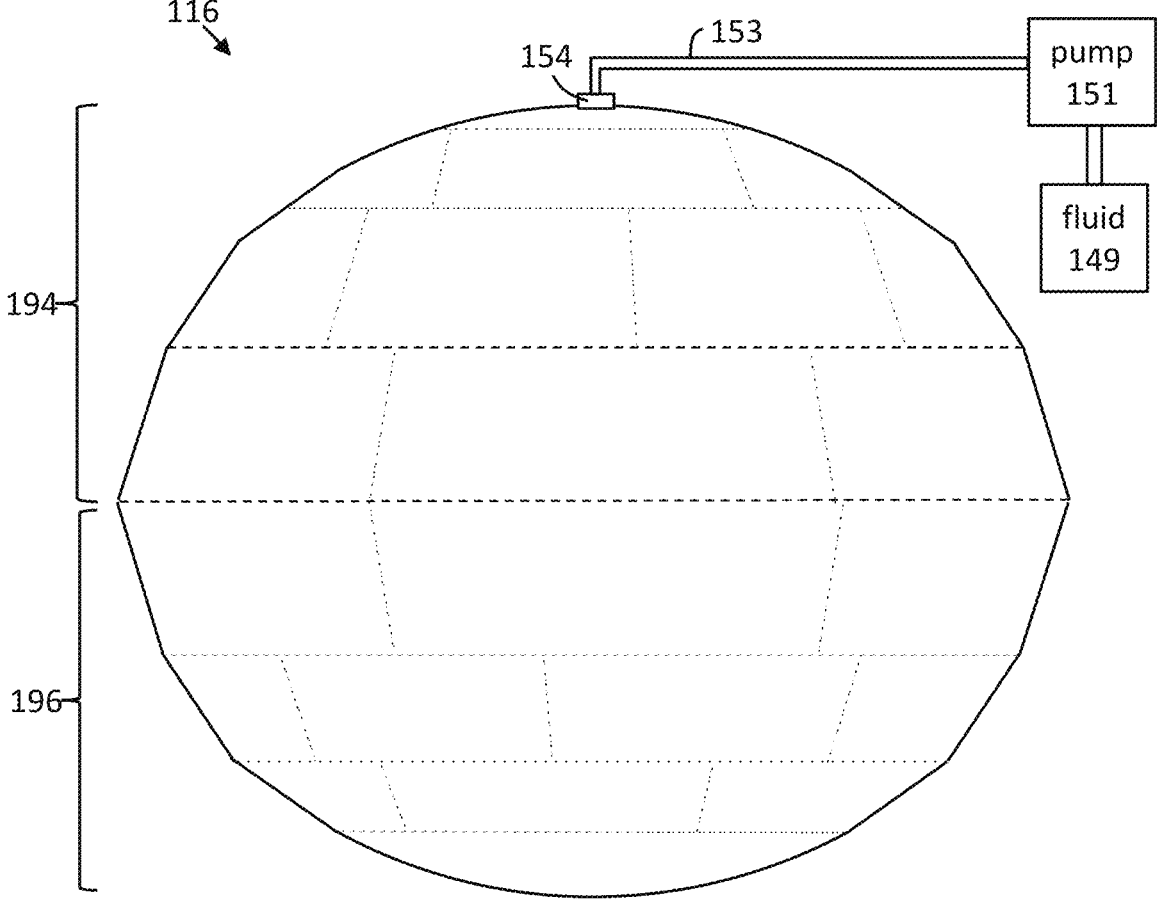
FIG. 32 is an elevation view of the multi-conic preform used to manufacture the ellipsoidal tank of FIG. 11.

The present disclosure relates to a shell 10 formed of welded sheet metal components (see FIGS. 8, 9, 33, 34), a tank 12 (e.g., internal pressure vessel) including at least one shell 10 (see FIGS. 11-13), a vehicle 14 including at least one shell 10 (see FIG. 14), a multi-conic preform 16 used to manufacture at least one shell 10 (see FIGS. 18 and 19), a method for assembling the multi-conic preform 16 (see FIGS. 20-32), and a method for manufacturing at least one shell 10 using the preform 16 (see FIG. 32).

The shell 10 can have various shapes. In some embodiments (see FIGS. 8 and 9), the shell 10 has a semi-ellipsoidal shape. In other embodiments, (see FIG. 33), the shell 10 has a semi-toroidal or toroidal shape. In still other embodiments, the shell 10 can have another shape defined by a surface of revolution.

Figure 1:
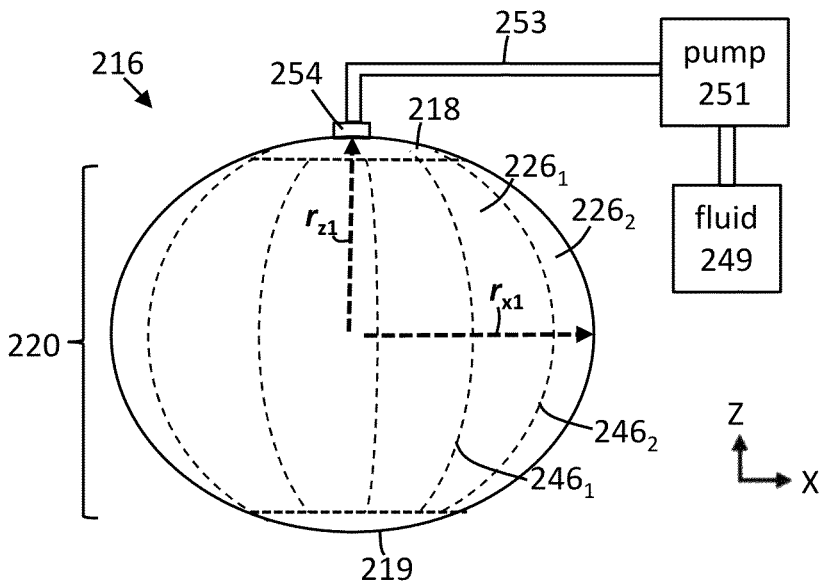
FIG. 1 is a schematic elevation view of a prior art preform made of welded sheet metal components.
Figure 2:
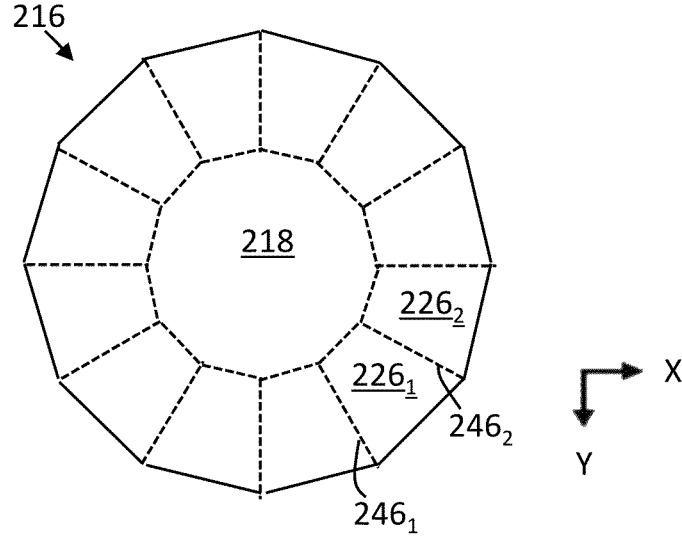
FIG. 2 is a plan view of the prior art preform of FIG. 1.
Figure 3:
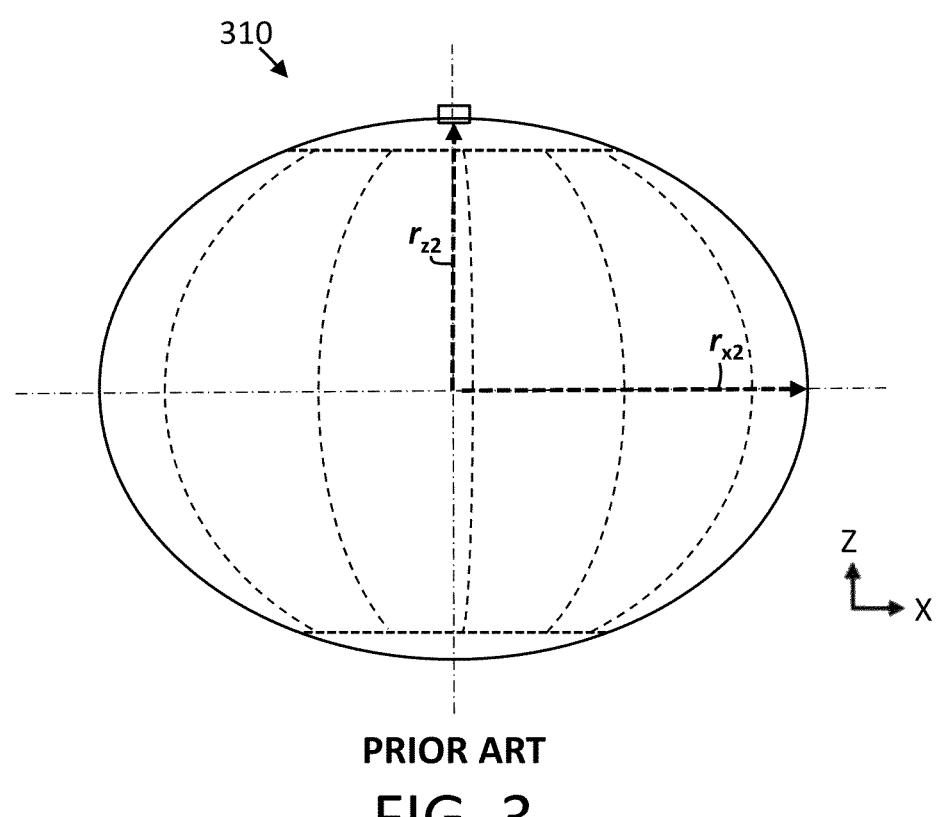
FIG. 3 is a schematic elevation view of a prior art ellipsoidal shell manufactured using the preform of FIG. 1.
Figure 4:
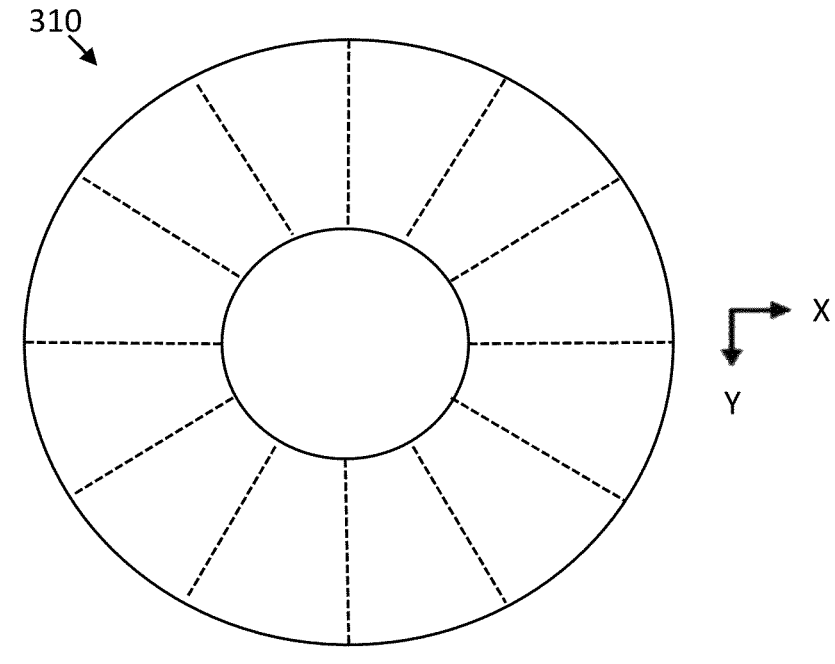
FIG. 4 is a plan view of the prior art ellipsoidal shell of FIG. 3.
Figure 8:
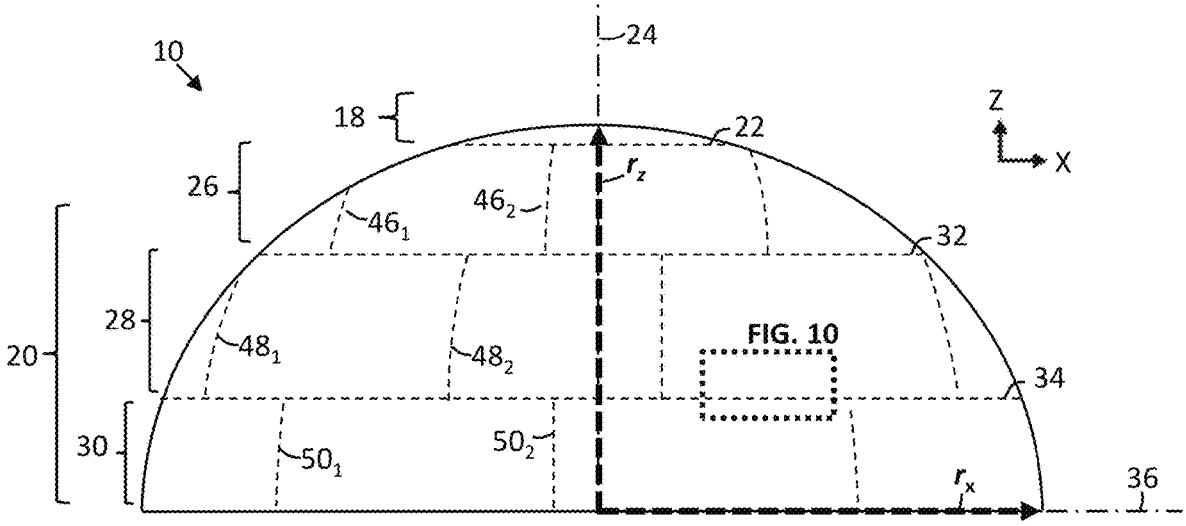
FIG. 8 is an elevation view of a semi-ellipsoidal embodiment of the present shell.

Referring to FIG. 8, in embodiments in which the shell 10 has a semi-ellipsoidal shape, the shell 10 includes a cap 18, an annular wall 20, and a latitudinal cap weld 22 joining the cap 18 to the wall 20. The cap 18 and the wall 20 are sheet metal components (e.g., stretch hardened sheet metal components) having respective shapes formed in part by a fluid pressure forming process described hereinbelow. The wall 20 is longitudinally segmented so as to include a plurality of annular wall segments 26, 28, 30, each of which is joined to an adjacent wall segment by a respective latitudinal wall weld 32, 34. In particular, the wall 20 includes at least a top wall segment 26, a bottom wall segment 30, and a first latitudinal wall weld 32 disposed therebetween. The top wall segment 26 is the portion of the wall 20 that is joined to the cap 18 via the latitudinal cap weld 22. In the illustrated embodiment, the bottom wall segment 30 defines a maximum radius $r_x$ of the shell 10 in a direction of a second semi-axis 36 (e.g., a major semi-axis) perpendicular to the first semi-axis 24.

Figure 9:
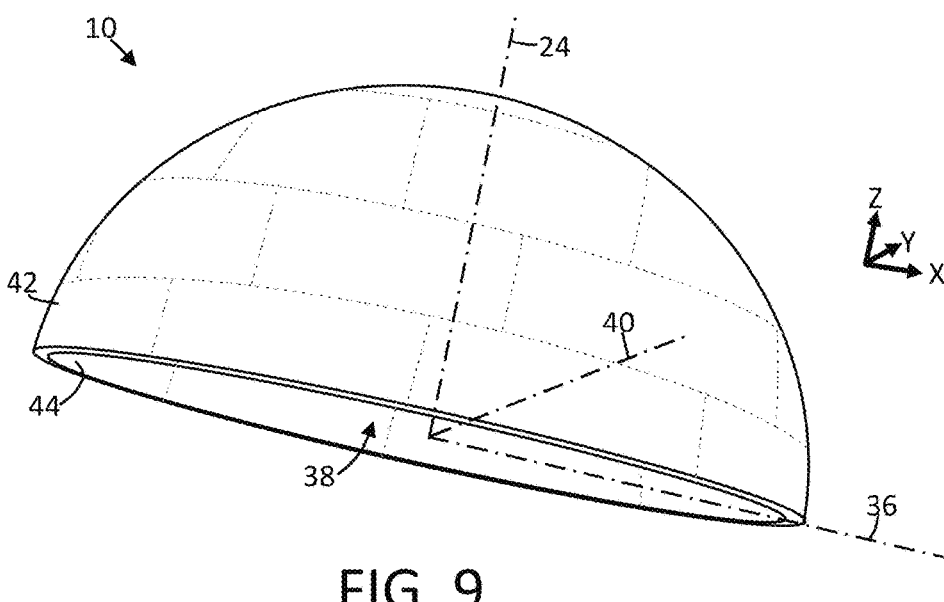
FIG. 9 is a perspective view of the shell of FIG. 8.

Referring to FIGS. 8 and 9, in the illustrated embodiment, the cap 18 and wall 20 of the shell 10 are shaped such that their respective outer surfaces collectively define the semi-ellipsoidal shape of the shell 10. Referring to FIG. 9, the shell 10 also defines an inner cavity 38 having a corresponding semi-ellipsoidal shape. The inner cavity 38 is defined by the respective inner surfaces of the cap 18 and wall 20. In the illustrated embodiment, the shell 10 is a thin-walled, monocoque structure. In other embodiments, the shell 10 is a semi-monocoque structure having one or more stiffening elements disposed relatives to the cap 18 and/or the wall 20.

In embodiments in which the shell 10 has a semi-ellipsoidal shape, the shell 10 can be configured in various different ways. For example, the shape of the shell 10 can be that of an oblate semi-ellipsoid (i.e., a semi-ellipsoid formed when a semi-ellipse with a semi-minor axis dimension and semi-major axis dimension is rotated about its semi-minor axis), a prolate semi-ellipsoid (i.e., an ellipsoid formed when a semi-ellipse with a semi-minor axis dimension and semi-major axis dimension is rotated about its semi-major axis), or a triaxial semi-ellipsoid (i.e., a semi-ellipsoid with different dimensions along all three semi-axes).

In the embodiment illustrated in FIGS. 8 and 9, for example, the semi-ellipsoidal shell 10 is shaped such that radii $r_x$, $r_y$ defined along the second and third semi-axes 36, 40 are equal to one another and are greater than the radius $r_z$ defined along the first semi-axis 24. The cap 18 and wall 20 are co-axially aligned relative to a first semi-axis 24 (e.g., a minor semi-axis) of the semi-ellipsoidal shell 10. The shell 10 is axisymmetric relative to the first semi-axis 24 and therefore has an oblate semi-ellipsoidal shape.

In other embodiments in which the shell 10 has a semi-ellipsoidal shape, the shell 10 is shaped such that radii $r_x$, $r_y$ defined along the second and third semi-axes 36, 40 are equal to one another but are less than the radius $r_z$ defined along the first semi-axis 24. In such embodiments, the shell 10 is axisymmetric relative to the first semi-axis 24 and therefore has a prolate semi-ellipsoidal shape.

In still other embodiments in which the shell 10 has a semi-ellipsoidal shape, the shell 10 is shaped such that radii $r_x$, $r_y$, $f_z$ defined along the first, second, and third semi-axes 24, 36, 40 are all different relative to one another. In such embodiments, the shell 10 is not axisymmetric relative to any of the semi-axes 24, 36, 40 and therefore has a triaxial semi-ellipsoidal shape.

Referring again to FIG. 8, the cap 18 is a seamless integral component with a shape (e.g., a semi-ellipsoidal shape, a dome shape, a disc shape, etc.) that is obtained in part by the fluid pressure forming process described hereinbelow. In the illustrated embodiment, the cap 18 defines the co-vertex of the semi-ellipsoidal shell 10 and is axisymmetric relative to the first semi-axis 24.

Referring still to FIG. 8, the number of annular wall segments 26, 28, 30 included in the wall 20 can vary. In some embodiments, the wall 20 includes only the top and bottom wall segments 26, 30. In such embodiments, the first latitudinal wall weld 32 joins the top and bottom wall segments 26, 30 to one another. In other embodiments, including the embodiment illustrated in FIG. 8, the wall 20 includes at least one intermediate wall segment 28 disposed between the top and bottom wall segments 26, 30. In such embodiments, the first latitudinal wall weld 32 joins the top wall segment 26 to the intermediate wall segment 28 adjacent thereto, and the wall 20 further includes at least one second latitudinal wall weld 34 joining the at least one intermediate wall segment 28 to the bottom wall segment 30.

Referring still to FIG. 8, in the illustrated embodiment, the annular wall segments 26, 28, 30 each have a shape of a frustum of an ellipsoid. Referring to FIG. 9, each wall segment 26, 28, 30 defines a portion of an outer surface 42 of the shell 10, a portion of an opposing inner surface 44 of the shell 10, and one or more thicknesses defined therebetween. In some embodiments, the respective thicknesses of the wall segments 26, 28, 30 differ from one another. In other embodiments, the respective thicknesses of the wall segments 26, 28, 30 are at least substantially the same relative to one another.

In some embodiments, the respective thicknesses of the cap 18 and/or the wall 20 are selected based on a predetermined pressure that is to be contained in the shell 10 during normal use thereof. In some embodiments, the shell 10 has a D/t ratio above 500, where D is the largest diameter of the shell 10 and t is a thickness of the cap 18 and/or the wall 20 (e.g., the nominal thickness of the cap 18 and the wall 20). In other embodiments, the shell 10 has a D/t ratio that is above 1000. In still other embodiments, the shell 10 has a D/t ratio that is above 2000. In still other embodiments, the shell 10 has a D/t ratio that is above 3000. In some embodiments, the largest diameter D of the shell 10 has a magnitude of approximately 1, 2, 3, 4, 5, 6, 7, 8, 9, or 10 meters. In some embodiments, the largest diameter D of the shell 10 has a magnitude that is greater than 10 meters.

Referring FIG. 8, each annular wall segment 26, 28, 30 includes at least one longitudinal weld $46_i$, $48_i$, $50_i$. In some embodiments, one or more of the wall segments 26, 28, 30 are latitudinally segmented into a plurality of sub-segments, each of which is joined to an adjacent sub-segment by a respective longitudinal weld $46_i$, $48_i$, $50_i$. The number of sub-segments in a given wall segment can vary, for example, from two (2) sub-segments to ten (10) or more sub-segments. In the illustrated embodiment, the top wall segment 26 includes a plurality of sub-segments, each joined to an adjacent sub-segment by a respective longitudinal weld $46_i$. Similarly, the intermediate wall segment 28 includes a plurality of sub-segments, each joined to an adjacent sub-segment by a respective longitudinal weld $48_i$. Finally, the bottom wall segment 30 includes a plurality of sub-segments, each joined to an adjacent sub-segment by a respective longitudinal weld $50_i$.

Figure 10:
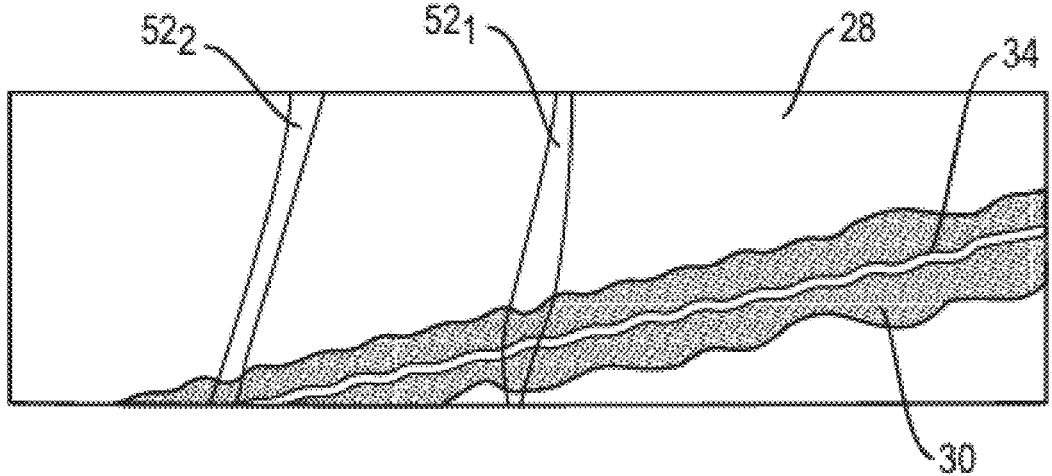
FIG. 10 is a perspective view of a wrinkle in the wall of the shell of FIG. 8.

Referring to FIGS. 8 and 10, in some embodiments, the wall 20 includes at least one wrinkle $52_i$ caused by plastic deformity and bulging that occurred during a fluid pressure forming process described hereinbelow. In other embodiments, the wall 20 is at least substantially free of wrinkles. In such embodiments, an outer surface of the wall 20 has a smoothly curved shape extending across an entirety thereof.

The sheet metal components of the cap 18 and the wall 20 can be made of various types of material (e.g., steel, aluminum, etc.). In the illustrated embodiments, the sheet metal components are a stainless steel (e.g., austenitic stainless steel, martensitic stainless steel). In some embodiments, at least some of the sheet metal components are martensitic stainless steel as a result of austenitic-to-martensitic work hardening that occurred during a fluid pressure forming process described hereinbelow. In some embodiments, a first component of the shell 10 has a first predetermined hardness, and a second component of the shell 10 has a second predetermined hardness that differs from the first predetermined hardness. For example, in some embodiments, the cap 18 is formed of annealed stainless steel sheet metal, while the wall 20 is formed of hard stainless steel sheet metal (e.g., full hard, half hard, etc.). In some embodiments, the various segments 26, 28, 30 of the wall 20 are formed of different respective sheet metal materials having different predetermined hardnesses. The materials of the respective wall segments 26, 28, 30 can be selected based on an expected amount of plastic deformity and bulging occurring during a fluid forming process. For example, in some embodiments, the bottom wall segment 30 can be expected to experience less plastic deformity and bulging than the top wall segment 26 and/or the cap 18. In such embodiments, the material of the sheet metal forming the bottom wall segment 30 may have a predetermined hardness that is less than that of the sheet metal material forming the top wall segment 26 and/or the cap 18. In other embodiments, the bottom wall segment 30 can be expected to experience more plastic deformity and bulging than the top wall segment 26 and/or the cap 18. In such embodiments, the material of the sheet metal forming the bottom wall segment 30 may have a predetermined hardness that is greater than that of the sheet metal material forming the top wall segment 26.

In some embodiments, a first component of the shell 10 has a first predetermined thickness, and a second component of the shell 10 has a second predetermined thickness that differs from the first predetermined thickness. The respective thicknesses of the wall segments 26, 28, 30 can be selected based on an expected amount of plastic deformity and bulging occurring during a fluid forming process. For example, in some embodiments, the bottom wall segment 30 can be expected to experience less plastic deformity and bulging than the top wall segment 26 and/or the cap 18. In such embodiments, the material of the sheet metal forming the bottom wall segment 30 may have a predetermined thickness that is less than that of the sheet metal material forming the top wall segment 26. In other embodiments, the bottom wall segment 30 can be expected to experience more plastic deformity and bulging than the top wall segment 26 and/or the cap 18. In such embodiments, the material of the sheet metal forming the bottom wall segment 30 may have a predetermined thickness that is greater than that of the sheet metal material forming the top wall segment 26.

In some embodiments, the shell 10 includes one or more additional components not shown in the drawings. For example, in some embodiments the shell 10 includes at least one stiffening component (e.g., a rib, a stringer, a doubler plate disposed relative to a weld, etc.).

Figure 11:
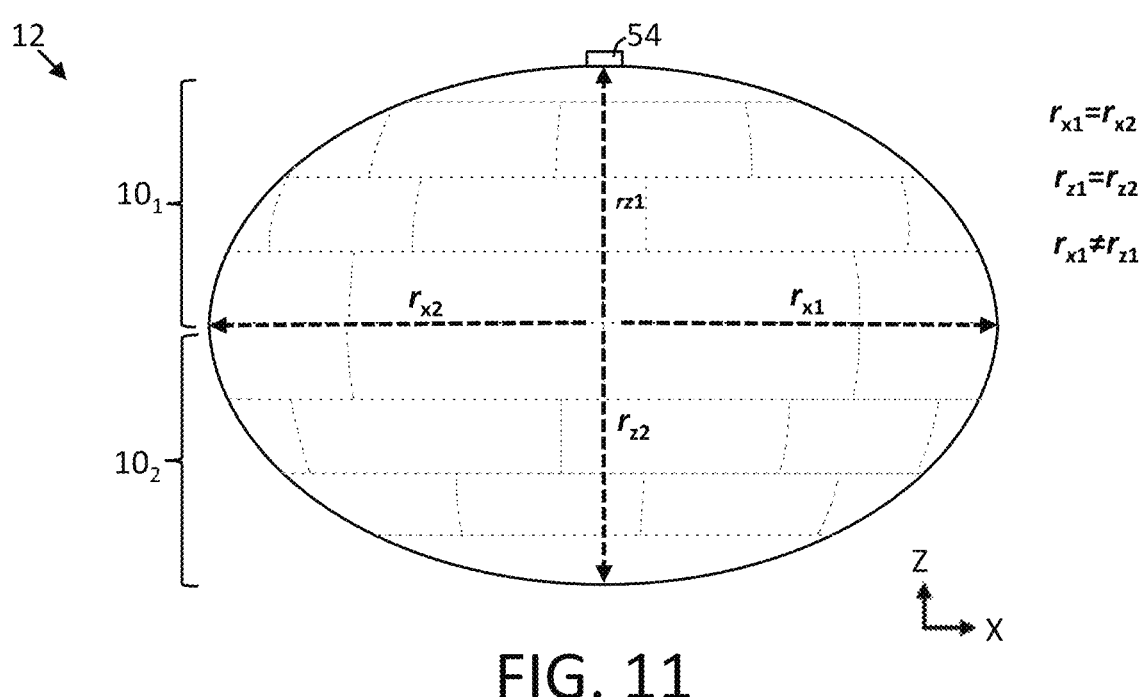
FIG. 11 is an elevation view of an ellipsoidal tank formed by two semi-ellipsoidal shells.
Figure 12:
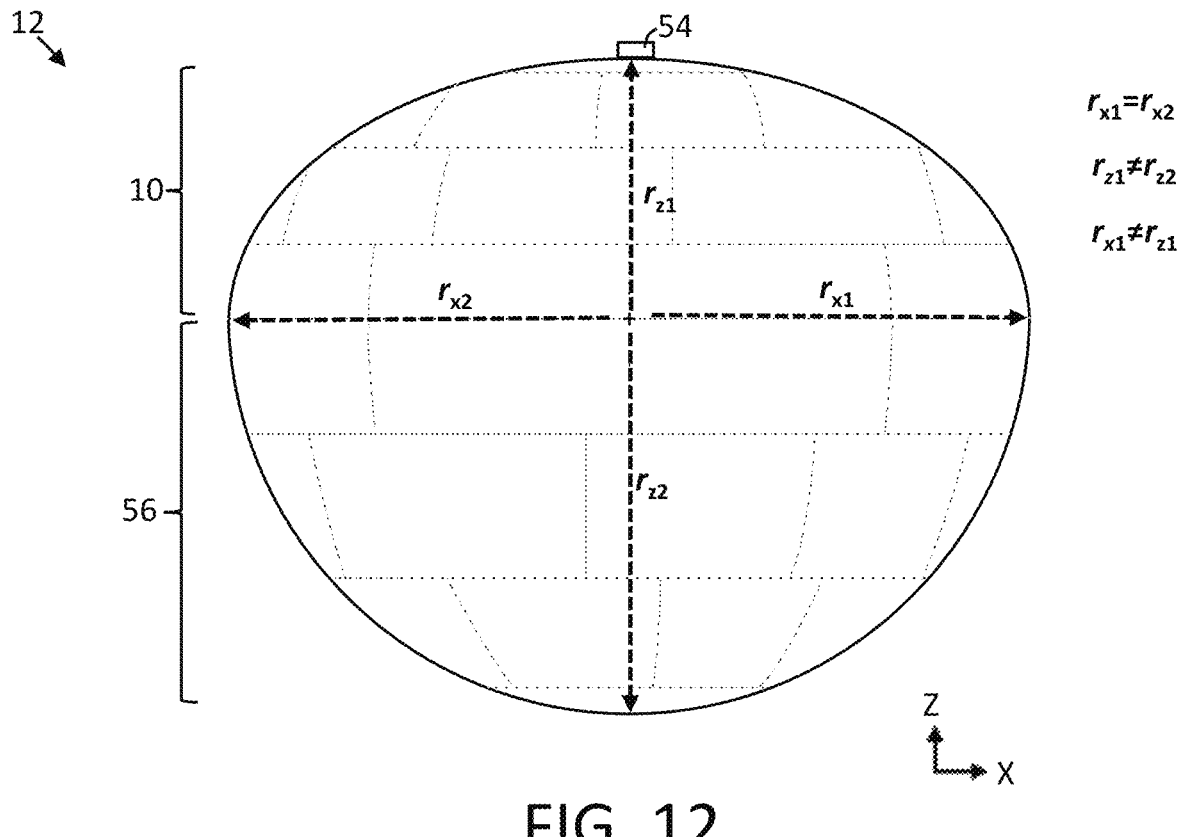
FIG. 12 is an elevation view of a tank including a top portion formed by a semi-ellipsoidal shell, and a bottom portion formed by a semi-spherical shell.
Figure 13:
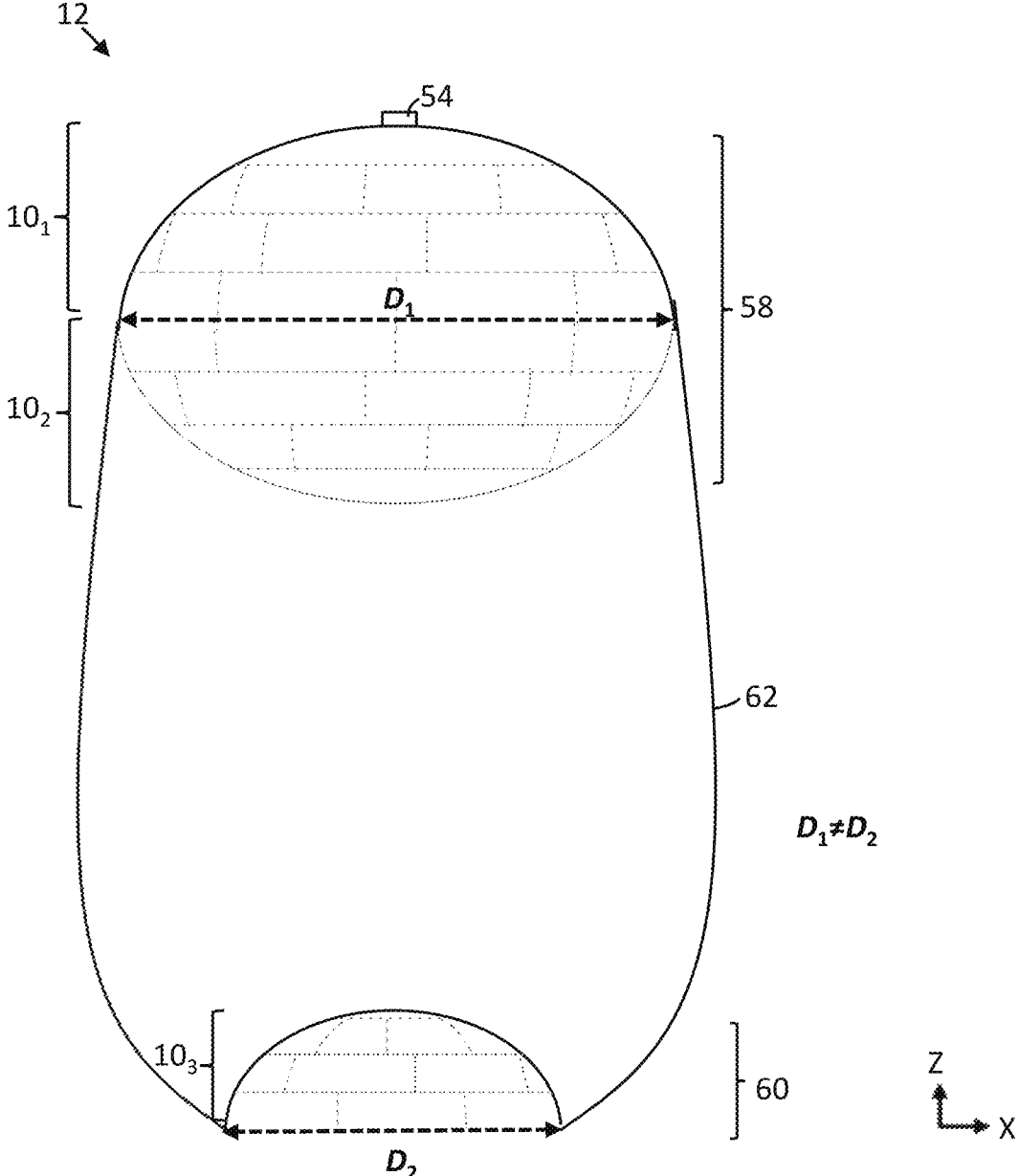
FIG. 13 is an elevation view of a multi-chamber tank with an upper chamber defined by two semi-ellipsoidal shells, and a lower chamber defined by a semi-ellipsoidal shell.

Referring to FIGS. 11-13, the present tank 12 includes at least one shell 10. In some embodiments, the tank 12 includes at least one port 54 through which a fluid medium flows between an exterior of the tank 12 and an interior cavity defined by the tank 12. The tank 12 can be configured for various purposes. For example, in some embodiments, the tank 12 is used to store fuel for a rocket or another vehicle.

The tank 12 can have various different shapes and configurations. Referring to FIG. 11, in some embodiments, the tank 12 has an ellipsoidal shape formed by two identical semi-ellipsoidal shells 10₁, 10₂ that are joined together (e.g., via a latitudinal weld). In some embodiments not shown in the drawings, the tank 12 is formed by two non-identical semi-ellipsoidal shells 10 that are joined together. Referring to FIG. 12, in some embodiments, the tank 12 has a non-ellipsoidal shape defined by a semi-ellipsoidal shell 10 and a non-ellipsoidal shell 56 that are joined together. In the embodiment of FIG. 12, for example, the tank 12 includes a semi-ellipsoidal shell 10 joined to a semi-spherical shell 10. Referring to FIG. 13, in some embodiments, the tank 12 includes more than two semi-ellipsoidal shells 10. In the embodiment of FIG. 13, for example, the tank 12 includes identical first and second semi-ellipsoidal shells 10₁, 10₂ that are joined together to define an ellipsoidal upper chamber 58 having a first diameter $D_1$, and a third semi-ellipsoidal shell 10₃ defining a lower chamber 60 having a second diameter $D_2$ that is less than the first diameter $D_1$. In the illustrated embodiment, the tank 12 includes a tank wall 62 extending between the upper chamber 58 and the lower chamber 60.

Figure 14:
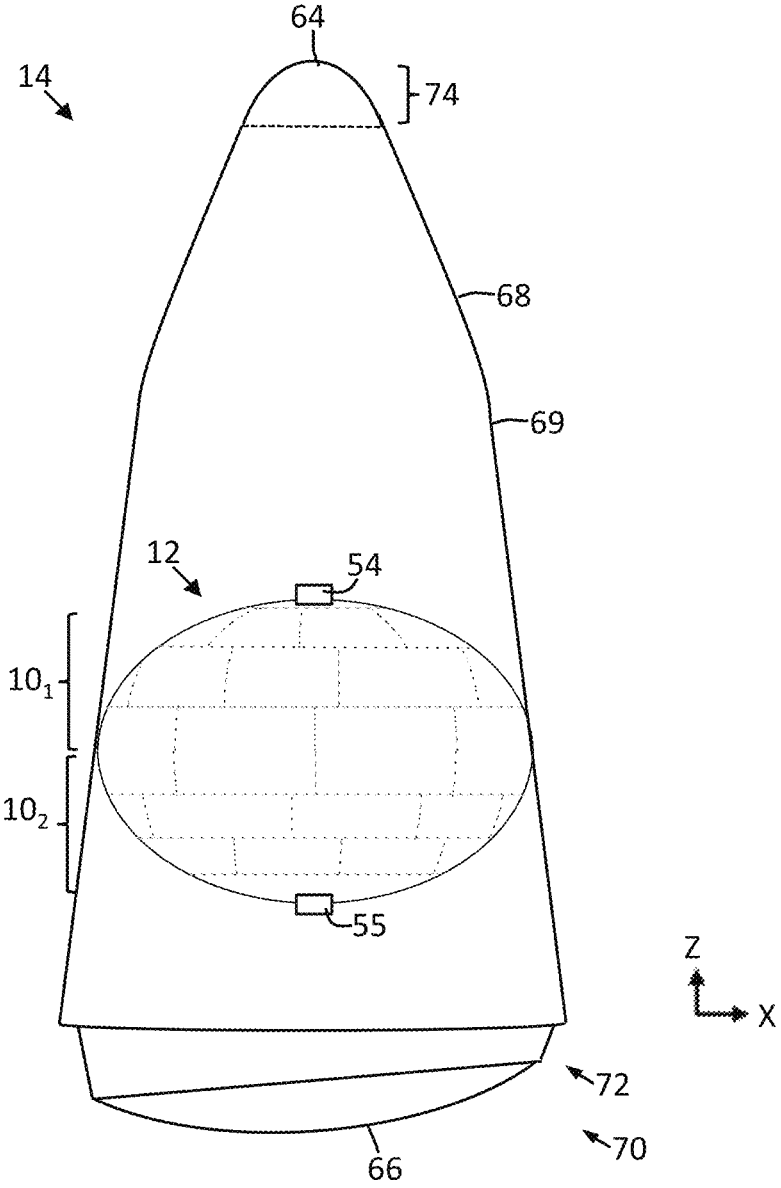
FIG. 14 is a schematic elevation view of an upper stage rocket having an internal tank formed by two semi-ellipsoidal shells.

Referring to FIG. 14, the present vehicle 14 includes at least one shell 10. In some embodiments, the vehicle 14 is a rocket (e.g., a multi-stage rocket, a single-stage-to-orbit (SSTO) rocket, an upper stage rocket, a booster rocket, etc.), a missile, a spacecraft, an aircraft, or another vehicle designed for travel (e.g., flight) up to at least supersonic speeds (e.g., supersonic speeds, hypersonic speeds, re-entry speeds, etc.) in atmospheric, sub-orbital, orbital, extraterrestrial, and/or outer space environments. Referring to FIG. 14, in the illustrated embodiment, the vehicle 14 is a reusable second stage rocket of a two-stage rocket system. The second stage rocket is described in more detail in the commonly-assigned International Patent Application No. PCT/US22/71686, filed Apr. 13, 2022, and International Patent Application No. PCT/US22/71688, filed Apr. 13, 2022, the contents of which are incorporated by reference herein in their entirety. The vehicle 14 extends between a forward end 64 and an opposing aft end 66. The vehicle 14 includes a payload housing 68 proximate the forward end 64, and an engine 70 and nozzle 72 proximate the aft end 66. The payload housing 68 is enclosed by a sidewall 69 of the vehicle 14. In the illustrated embodiment, the vehicle 14 includes identical first and second semi-ellipsoidal shells 10₁, 10₂ that are joined together to form a fuel tank 12 having inlet and outlet ports 54, 55. In some embodiments, the vehicle 14 additionally or alternatively includes at least one shell 10 forming a different component of the vehicle 14. In the embodiment illustrated in FIG. 14, for example, a semi-ellipsoidal shell forms the nose 74 at the forward end 64 of the vehicle 14, and another shell forms a portion of the nozzle 72 at the aft end 66 of the vehicle 14. In particular, the nozzle 72 includes a centerbody sidewall and centerbody base that form respective outer surfaces of an actively-cooled heat shield used during base-first reentry of the vehicle 14, and the centerbody base includes a shell manufactured from a multi-conic preform using the techniques described herein. In some such embodiments, the shell forms an outer surface of the heat shield, and the shell is joined (e.g., via diffusion bonding, braising, etc.) to one or more inner materials to form a structure (e.g., a sandwich structure) defining fluid channels for actively dissipating heat from the outer shell.

Figures 15, 16:
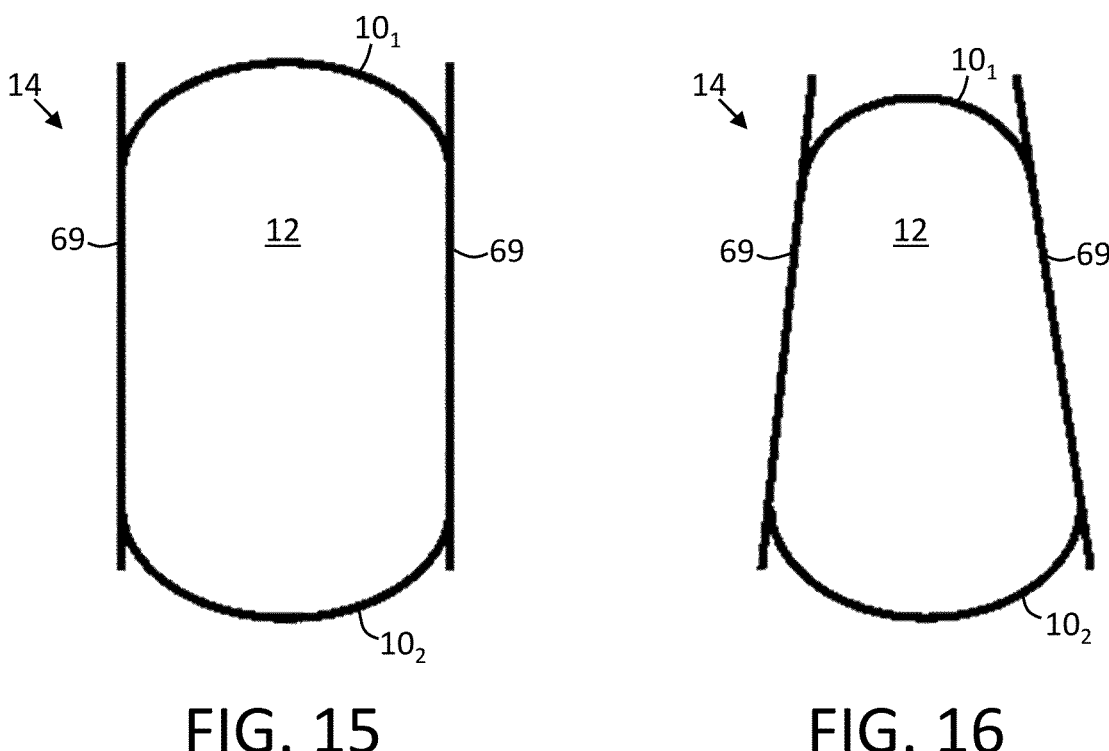
FIG. 15 is a schematic elevation view of a portion of a rocket having an internal tank formed by two semi-ellipsoidal shells and a cylindrical sidewall of the rocket.
FIG. 16 is a schematic elevation view of a portion of a rocket having an internal tank form by two semi-ellipsoidal shells and a conical sidewall of the rocket.
Figure 17:
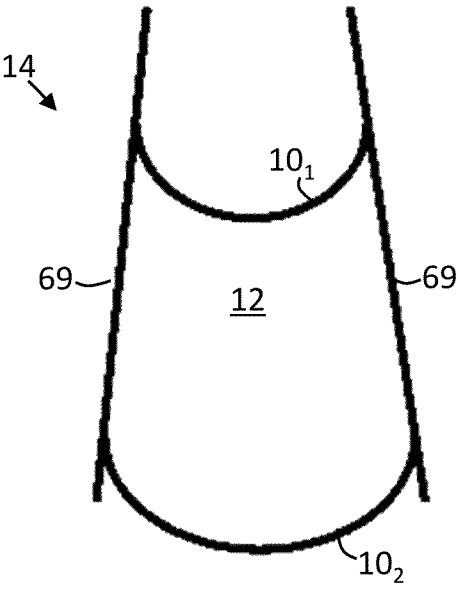
FIG. 17 is a schematic elevation view of a portion of a rocket having an internal tank form by two semi-ellipsoidal shells and a conical sidewall of the rocket.

Referring to FIGS. 15-17, in some embodiments, the internal cavity of the tank 12 is defined at least partially by a wall of the vehicle 14 (e.g., a cylindrical sidewall, a conical sidewall). In the embodiment illustrated in FIG. 15, for example, the vehicle 14 is a rocket, and the internal cavity of the tank 14 is defined by an upper semi-ellipsoidal shell 10₁, a lower semi-ellipsoidal shell 10₂, and a portion of a cylindrical rocket sidewall 69 extending therebetween. In the embodiments illustrated in FIGS. 16 and 17, the vehicle 14 is a rocket, and the internal cavity of the tank 14 is defined by an upper semi-ellipsoidal shell 10₁, a lower semi-ellipsoidal shell 10₂, and a portion of a conical rocket sidewall 69 extending therebetween. In the embodiment of FIG. 16, the upper and lower semi-ellipsoidal shells 10₁, 10₂ are configured such that they form concave inner surfaces of the tank 12. In the embodiment of FIG. 17, the lower semi-ellipsoidal shell 10₂ forms a concave inner surface of the tank 12, while the upper semi-ellipsoidal shell 10₁ forms a convex inner surface of the tank 12.

Figures 18, 19:
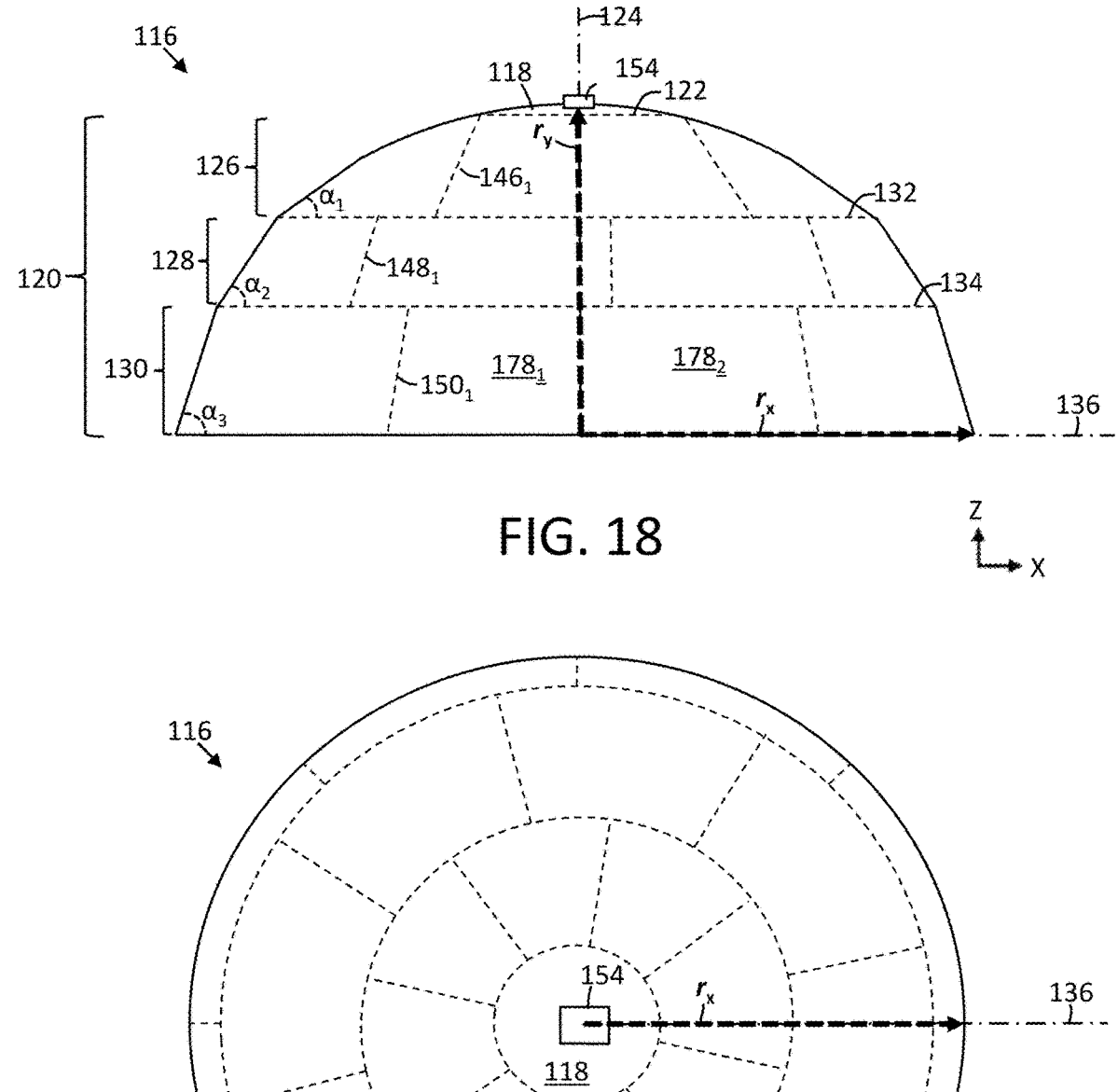
FIG. 18 is an elevation view of the multi-conic preform used to manufacture the semi-ellipsoidal shell of FIG. 8.
FIG. 19 is a plan view of the multi-conic preform of FIG. 15.

Referring to FIG. 18, an embodiment of the present multi-conic preform 116 used to manufacture at least one shell 10 with a semi-ellipsoidal shape includes a preform cap 118, a multi-conic preform wall 120, and a first latitudinal preform weld 122 joining the preform cap 118 to the preform wall 120. The preform cap 118 and the preform wall 120 are sheet metal components. The preform wall 120 is longitudinally segmented so as to include a plurality of annular preform wall segments 126, 128, 130, each of which is joined to an adjacent wall segment by a respective latitudinal preform wall weld 132, 134. In particular, the preform wall 120 includes at least a top preform wall segment 126, a bottom preform wall segment 130, and a first latitudinal preform wall weld 132 disposed therebetween. The top preform wall segment 126 is the portion of the preform wall 120 that is joined to the preform cap 118 via the latitudinal preform cap weld 122. In the illustrated embodiment, the bottom preform wall segment 130 defines a maximum radius $r_x$ of the preform 116 in a direction of a second semi-axis 136 (e.g., a major semi-axis) perpendicular to the first semi-axis 124.

Referring still to FIG. 18, in the illustrated embodiment, the preform cap 118 is a seamless integral component with an at least substantially flat disc shape. The preform cap 118 and the preform wall 120 are co-axially aligned relative to a first semi-axis 124 (e.g., a minor semi-axis) of the preform 116, and the preform cap 118 is axisymmetric relative to the first semi-axis 124. In other embodiments, the preform cap 118 has a semi-ellipsoidal shape, a dome shape, or another shape.

The number of preform wall segments 126, 128, 130 included in the preform wall 120 can vary, just as the number of wall segments 26, 28, 30 in the wall 20 of the shell 10 can vary. The preform wall segments 126, 128, 130 each have a shape of a frustum of a respective cone. In some embodiments, the preform wall segments 126, 128, 130 define different respective angles $\alpha_1$, $\alpha_2$, $\alpha_3$ relative to one another. In some embodiments, the respective thicknesses of the preform wall segments 126, 128, 130 differ from one another. In some embodiments, the respective thicknesses of the preform cap 118 and/or the preform wall 120 are selected to achieve a particular ratio relative to the largest diameter of the preform 116. In some embodiments, the preform 116 has a D/t ratio above 500, where D is the largest diameter of the preform 116 and t is a thickness of the preform cap 118 and/or the preform wall 120 (e.g., the nominal thickness of the preform cap 118 and the preform wall 120). In other embodiments, the preform 116 has a D/t ratio that is above 1000. In still other embodiments, the preform 116 has a D/t ratio that is above 2000. In still other embodiments, the preform 116 has a D/t ratio that is above 3000.

Referring still to FIG. 18, each preform wall segment 126, 128, 130 includes at least one longitudinal weld $146_i$, $148_i$, $150_i$. In some embodiments, one or more of the preform wall segments 126, 128, 130 is latitudinally segmented into a plurality of sub-segments, each of which is joined to an adjacent preform sub-segment by a respective preform longitudinal weld $146_i$, $148_i$, $150_i$. For example, in FIG. 18, the bottom preform wall segment 130 is latitudinally segmented into eight (8) sub-segments $178_i$. The number of sub-segments in a given preform wall segment can vary, for example, from two (2) sub-segments to ten (10) or more sub-segments.

Figure 20:
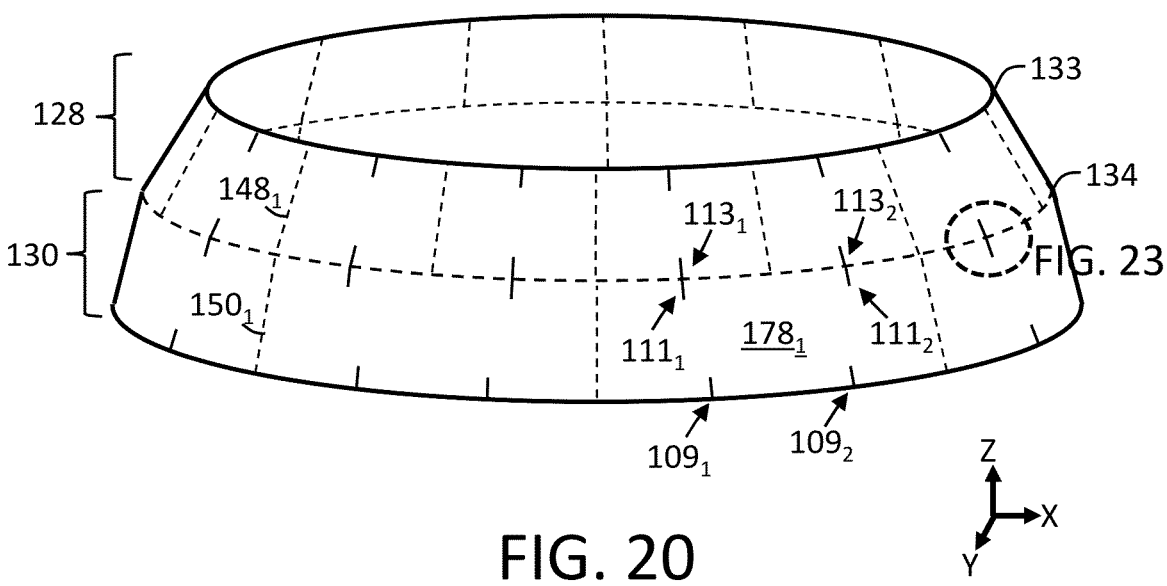
FIG. 20 is a perspective view of a bottom preform wall segment disposed relative to a first intermediate perform wall segment.

Referring to FIG. 20, the present method for assembling the preform 116 includes the steps of: providing at least first and second preform wall segments 130, 128, each in the form of a frustoconical sheet metal component; positionally fixing (e.g., via tack welding) the first preform wall segment 130 relative to the second preform wall segment 128; and joining the top edge of the first preform wall segment 130 to the bottom edge of the second preform wall segment 128 via a first latitudinal weld 134. In some embodiments, the first and second preform wall segments 130, 128 include respective alignment markings $111_i$, $113_i$, and the positionally fixing step involves positionally fixing the first preform wall segment 130 relative to the second preform wall segment 128 such that top edge alignment markings $111_i$ of the first preform wall segment 130 are aligned with bottom edge alignment markings $113_i$ of the second preform wall segment 128. In some embodiments, one or more additional frustoconical preform wall segments 126, 127 and/or the preform cap 118 are positionally fixed and joined to the first and second preform wall segments 130, 128 in a similar manner.

Figure 21:
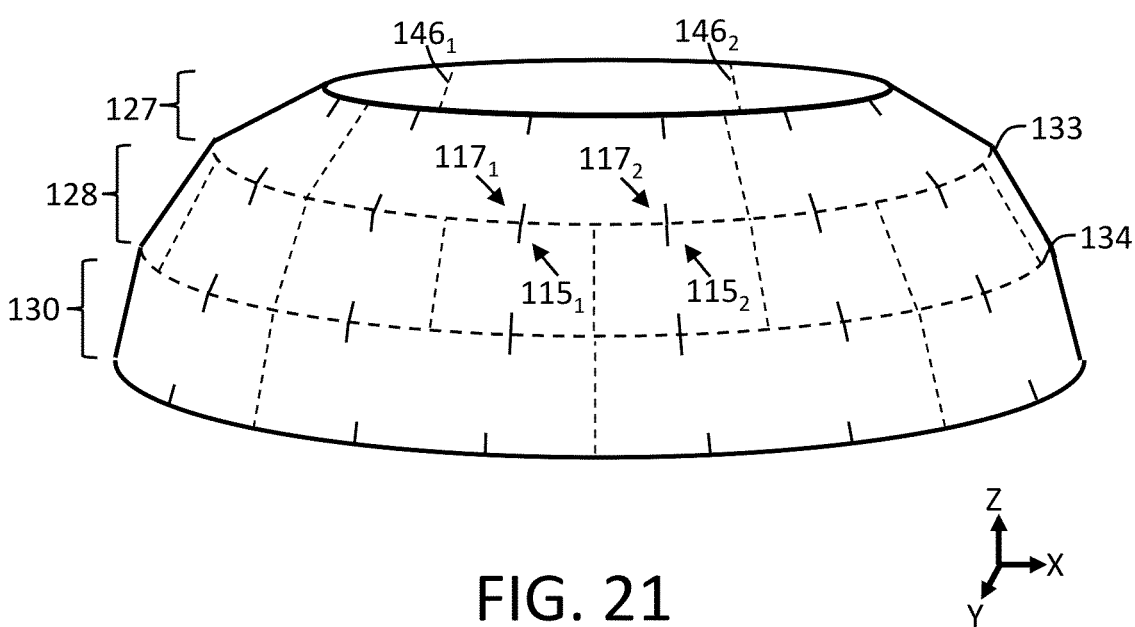
FIG. 21 is a perspective view of a second intermediate perform wall segment disposed relative to the bottom and first intermediate preform wall segments of FIG. 20.

Referring to FIG. 20, in the illustrated embodiment, the bottom preform wall segment 130 is positionally fixed relative to the first intermediate preform wall segment 128 such that the top edge alignment markings $111_i$ of the bottom preform wall segment 130 are aligned with the bottom edge alignment markings $113_i$ of the first intermediate preform wall segment 128. That is, each top edge alignment marking $111_i$ of the bottom preform wall segment 130 is aligned with a corresponding bottom edge alignment marking $113_i$ of the first intermediate preform wall segment 128. The top edge of the bottom preform wall segment 130 is then joined to the bottom edge of the first intermediate preform wall segment 128 via a first latitudinal weld 134. Referring to FIG. 21, the first intermediate preform wall segment 128 is then positionally fixed relative to a second intermediate preform wall segment 127 such that the top edge alignment markings $115_i$ of the first intermediate preform wall segment 128 are aligned with the bottom edge alignment markings $117_i$ of the second intermediate preform wall segment 127. The top edge of the first intermediate preform wall segment 128 is then joined to the bottom edge of the second intermediate preform wall segment 127 via a second latitudinal weld 133. Referring to FIG. 22, the second intermediate preform wall segment 127 is then positionally fixed relative to a top preform wall segment 126 such that the top edge alignment markings $119_i$ of the second intermediate preform wall segment 127 are aligned with the bottom edge alignment markings $121_i$ of the top preform wall segment 126. The top edge of the second intermediate preform wall segment 127 is then joined to the bottom edge of the top preform wall segment 126 via a third latitudinal weld 132. The preform cap 118 is then connected to the top preform wall segment 126 via a fourth latitudinal weld 131. In the illustrated embodiment, the preform wall segments are positionally fixed relative to one another via a plurality of tack welds, and the latitudinal welds 131, 132, 133, 134 are formed by a laser welding machine that remains stationary while the preform wall segments are rotated about the first preform semi-axis 124 via a rotary table.

Figure 25:
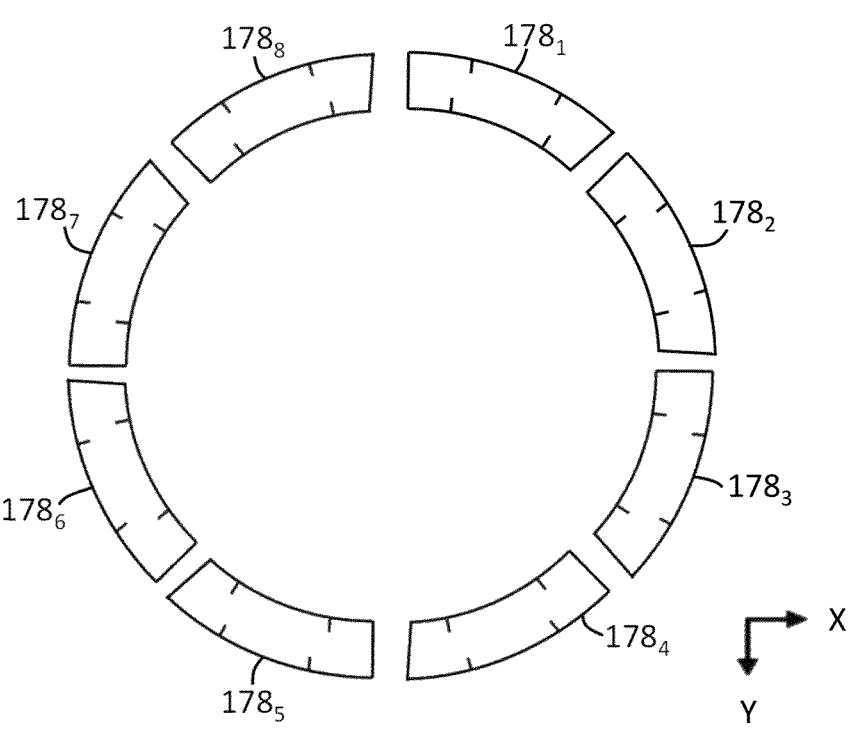
FIG. 25 is an exploded plan view of the sub-segments cut from the sheet metal plate of FIG. 23.
Figure 26:
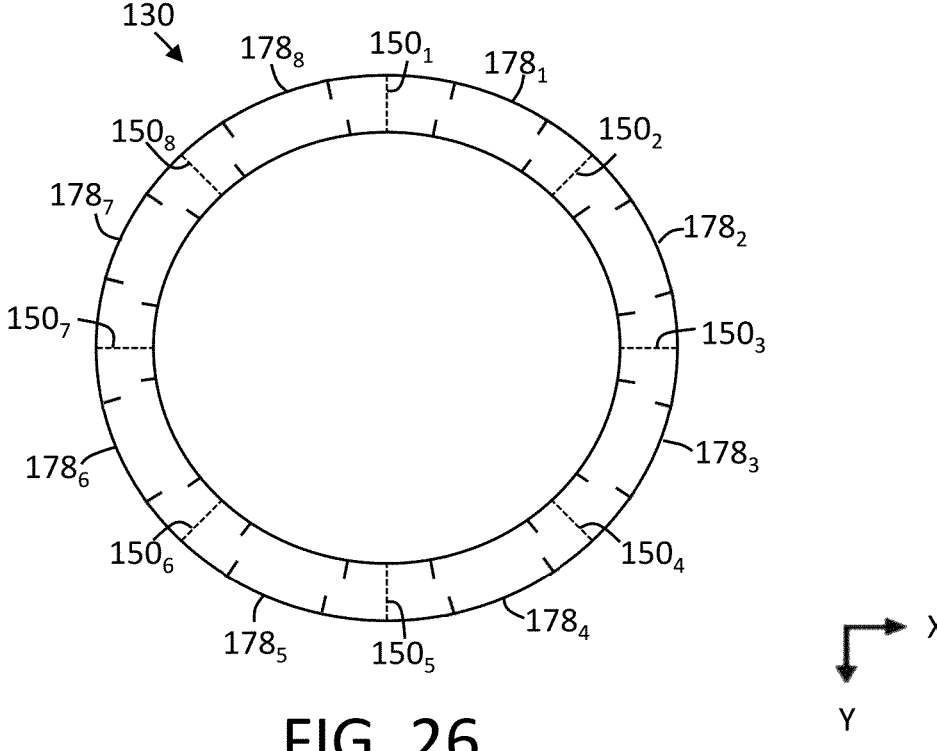
FIG. 26 is a plan view of the preform wall segment formed after the sub-segments of FIG. 25 are welded together.
Figure 27:
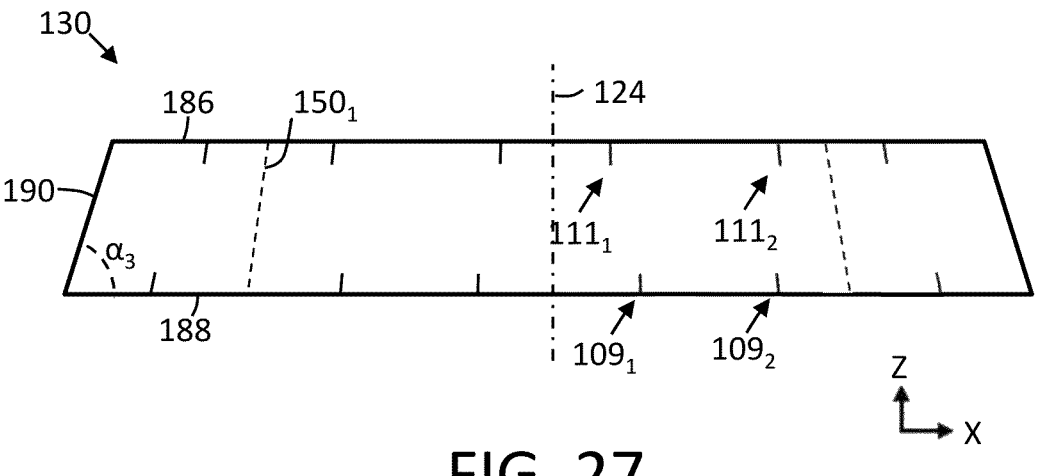
FIG. 27 is an elevation view of the preform wall segment of FIG. 26.
Figure 28:
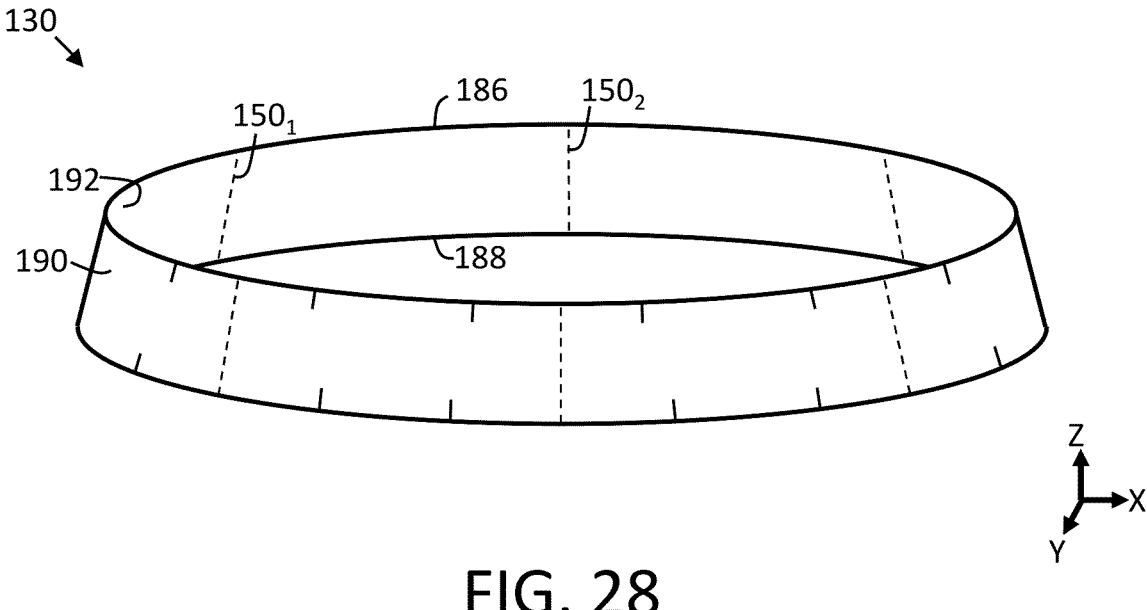
FIG. 28 is a perspective view of the preform wall segment of FIG. 26.

Referring to FIGS. 23-28, in some embodiments, the step of providing at least first and second preform wall segments includes forming a preform wall segment from a plurality of sub-segments. Referring to FIG. 23, in the illustrated embodiment, a sheet metal plate 176 is provided from which a plurality of sub-segments 178 of the bottom preform wall segment 130 are cut. Referring to FIG. 24, the sheet metal plate 176 has opposing planar surfaces 180, 182 and a thickness 184 defined therebetween. Referring to FIGS. 25 and 26, the sub-segments 178 are positioned relative to one another (FIG. 25) and welded together at their side edges to form the preform wall segment 130 (FIG. 26). Referring to FIG. 27, the preform wall segment 130 has top and bottom edges 186, 188 extending in respective planes perpendicular to the first preform semi-axis 124. An angle as is defined between the radially outer surface 190 and the plane defined by the bottom edge 188 of the preform wall segment 130. Referring to FIG. 28, a thickness defined between the radially outer surface 190 and the radially inner surface 192 of the preform wall segment 130 corresponds to the thickness 184 of the sheet metal plate 176 from which the sub-segments 178 of the preform wall segment 178 were cut (see FIG. 23). The above-mentioned steps may be repeated for one or more of the other preform wall segments 126, 127, 128 included in the preform 116. The respective sheet metal plates used to make each component of the preform 116 can have different materials, hardness, thickness, and/or other characteristics relative to one another. In other embodiments, one or more of the preform wall segments may be made from a single sheet metal component that is formed by welding together opposing ends to form a conic piece with a single longitudinal weld.

In some embodiments in which the preform wall segments include alignment markings, the alignment markings are provided on the preform wall segment, and/or sub-segments thereof, before such components are cut from a sheet metal plate. In FIG. 23, for example, the dashed lines indicate positions where the eight (8) sub-segments $178_i$ of the bottom preform wall segment 130 will be cut from the sheet metal plate 176. FIG. 23 shows that bottom edge alignment markings 109; and top edge alignment markings $111_i$ are provided on the sheet metal plate 176 before the sub-segments $178_i$ are cut therefrom. In some embodiments, including the illustrated embodiment, at least preform wall segment is configured such that all sub-subsegments of the preform wall segment are identical to one another, including the positioning of alignment markings thereon. Referring to FIG. 23, for example, the eight (8) sub-segments $178_i$ that will be cut from the sheet metal plate 176 are all identical to one another, including the respective positions of the alignment marking on each subsegment $178_i$. This configuration simplifies the manufacturing and assembly of the preform 116.

The alignment markings can be configured in various ways. Referring to FIGS. 27 and 28, in the illustrated embodiment, the alignment markings $109_i$, $111_i$ are shallow straight-line etchings provided at predetermined positions on the radially outer surface of the preform wall segments. The use of straight-line alignment markings can be advantageous in that corresponding alignment markings appear noticeably co-linear when they are in alignment with one another. Each alignment marking provides a visual indicator of a predetermined alignment position on a latitudinal (e.g., circumferential) edge of the preform wall segment. In the illustrated embodiments, when the preform 116 is assembled, the predetermined alignment positions spaced along the latitudinal edge of each preform wall segment lie in a plane perpendicular to the first preform semi-axis 124. The spacing of the alignment markings along the latitudinal edge of each preform wall segment can vary.

As shown in FIGS. 29-31 and 30, each alignment marking has a depth D (FIG. 30), a width W (FIG. 30), and a length L (FIG. 31). The respective magnitudes of the depth D, the width W, and the length L can be selected so that the alignment markings $113_i$ are readily visible for alignment purpose but cause only negligible (if any) weakening of the component. The width W of the alignment markings can affect the tolerance of the alignment. In some embodiments, the width W of the alignment markings can be selected so that the alignment tolerance is within a thickness of a tack weld provided during the step of positionally fixing preform wall segments relative to one another.

In the embodiment of FIGS. 29-31, the width W is approximately 0.01 inches (e.g., approximately 254 µm). In the embodiment of FIG. 31, the respective lengths $L_{111}$, $L_{113}$ of the alignment markings $111_i$, $113_i$ are such that the alignment markings extend outside of a zone 123 affected by heat during the joining of the top edge of the bottom preform wall segment 130 to the bottom edge of the first intermediate preform wall segment 128 via the first latitudinal weld 134 (hereinafter the "heat affected zone 123"). In other embodiments, the respective lengths $L_{111}$, $L_{113}$ of the alignment markings $111_i$, $113_i$ are such that the alignment markings do not extend outside of the heat affected zone 123. In other embodiments, the alignment markings are configured in a different manner. For example, in other embodiment, the alignment markings are disposed on the radially inner surface of the preform wall segment rather than the radially outer surface, the alignment markings have a shape other than a straight line, and/or the alignment markings are deposited on the preform wall segment rather than etched into the preform wall segment. In embodiments in which the alignment markings are deposited on (rather than etched in) the preform wall segment, the alignment markings have a height H rather than a depth D, and the alignment markings may be removed (e.g., via grinding) after the respective preform wall segments are positionally fixed and joined relative to one another. In some embodiments, a single device (e.g., a laser cutter) is used for both the etching of alignment markings in a sheet metal plate, and the cutting of preform wall sub-segments from the sheet metal plate. In such embodiments, the device can be operated at a first setting (e.g., a relative lower power) during the etching of alignment markings, and a second setting (e.g., a relatively higher power) during the cutting of preform wall sub-segments from the sheet metal plate.

The present method for assembling the preform is advantageous in that it avoids the need for expensive tooling and alignment jigs that are commonly used for similar applications, especially in the aerospace industry. The present method allows for preform wall segments to be positionally fixed relative to one another using only vice grips and tack welds. The individual preform wall segments can have relatively low rigidity due to their thin sheet metal material. However, rigidity drastically increases after only a handful of tack welds during the positionally fixing step. The increased rigidity and alignment marks make it possible for two technicians on circumferentially opposite sides of the preform wall segments to work simultaneously on providing tack welds at the joint between two corresponding alignment marks. The use of alignment marks further ensures that the continuous joint defined by the abutting latitudinal edges of adjected preform wall segments defines a consistent arc length relative to the first preform semi-axis 124. Without such alignment marks, the arc length can vary from one sector to the next. This can cause problematic bubbles in the preform, which can be difficult to correct once they are noticed.

Referring to FIG. 32, in some embodiments, two multi-conic portions 194, 196 are joined together to form a preform 116 that defines a closed internal cavity. In the embodiment of FIG. 31, each portion 194, 196 of the preform 116 is substantially identical to the preform 116 of FIG. 11. In other embodiments not shown in the drawings, the preform 116 is formed from two multi-conic portions 194, 196 having different respective shapes.

The present method for manufacturing the shell 10 using the preform 116 includes a first fluid pressure forming step, during which an inner surface of the preform 116 (e.g., a surface defining a closed inner cavity) is exposed to strengthening pressure that work hardens at least the preform cap 118 and the preform wall 120. Referring to FIG. 32, for example, the strengthening pressure may be applied by a fluid 149 that is injected into the internal cavity of the preform 116 via a pump 151, a hose 153, and the port 154 disposed in the preform cap 118. The method further includes a second fluid pressure forming step, during which the inner surface of the preform 116 is exposed to a design pressure that causes the preform 116 to plastically deform and bulge so as to form the shell 10. Although the first and second fluid pressure forming steps are described as discrete steps, in some embodiments they are performed in immediate succession and can alternatively be characterized as first and second sub-steps of a single fluid pressure forming step. In some embodiments, an unloading step is performed between the first and second fluid pressure forming steps. During the unloading step, the pressure applied to the inner surface of the preform 116 is reduced or removed entirely. In some embodiments, one or more of the steps are performed while the preform is exposed to cold temperatures using known cold stretching and/or cryostretching techniques. In some embodiments, the plastic deformation and bulging that occurs during the second pressure fluid pressure forming step causes one or both of the preform cap 118 and the preform wall 120 to form a wrinkle. In some embodiments, the second fluid pressure forming step includes exposing the inner surface of the preform 116 to the design pressure for a predetermined period of time after the wrinkle has formed. The respective pressures applied during the first and second pressure forming steps are not limited to any particular pressure magnitudes and can vary depending on one or more characteristics of the sheet metal components (e.g., thickness, material, etc.) and/or one or more performance requirements of the resulting shell 10 or tank 12 (e.g., a predetermined pressure that is to be contained in the shell 10 or tank 12 during normal use thereof). In some embodiments, the respective pressures are greater than 20 PSI (approximately 137 kPa). In some embodiments, the respective pressures are less than 500 PSI (approximately 3447 kPa). In some embodiments, the respective pressures are in a range between 20 PSI and 500 PSI. In other embodiments, the respective pressures exceed 500 PSI.

Figure 33:
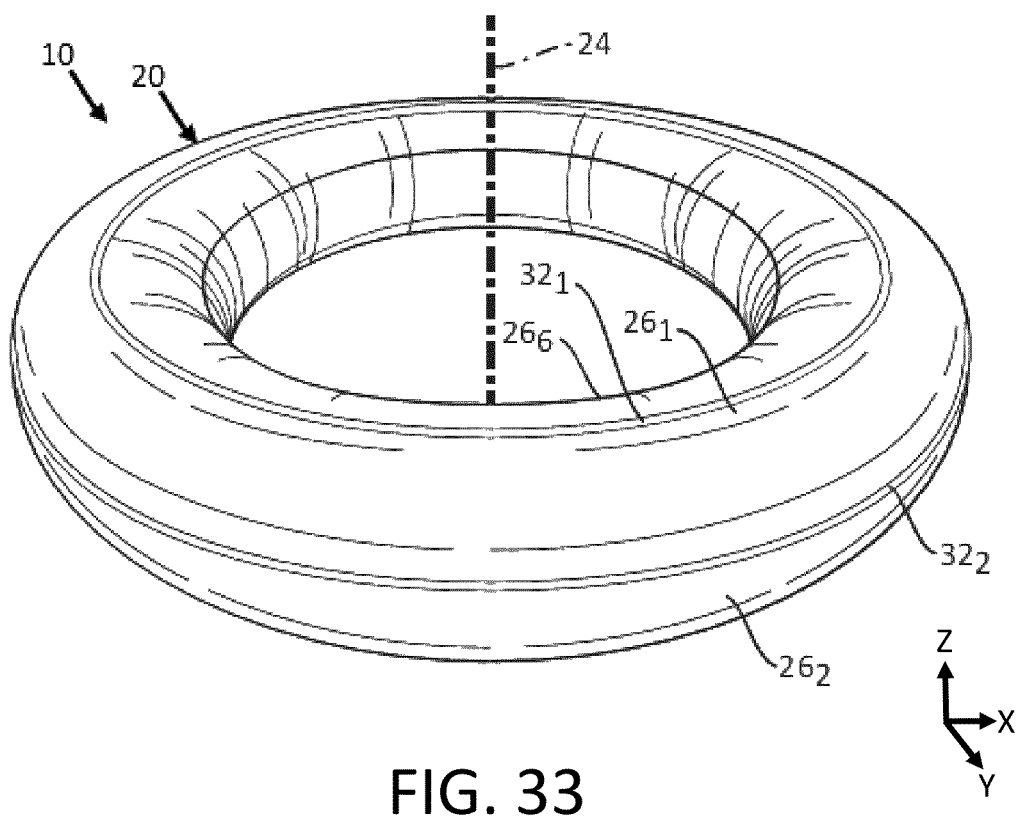
FIG. 33 is a perspective view of a toroidal embodiment of the present shell.
Figure 34:
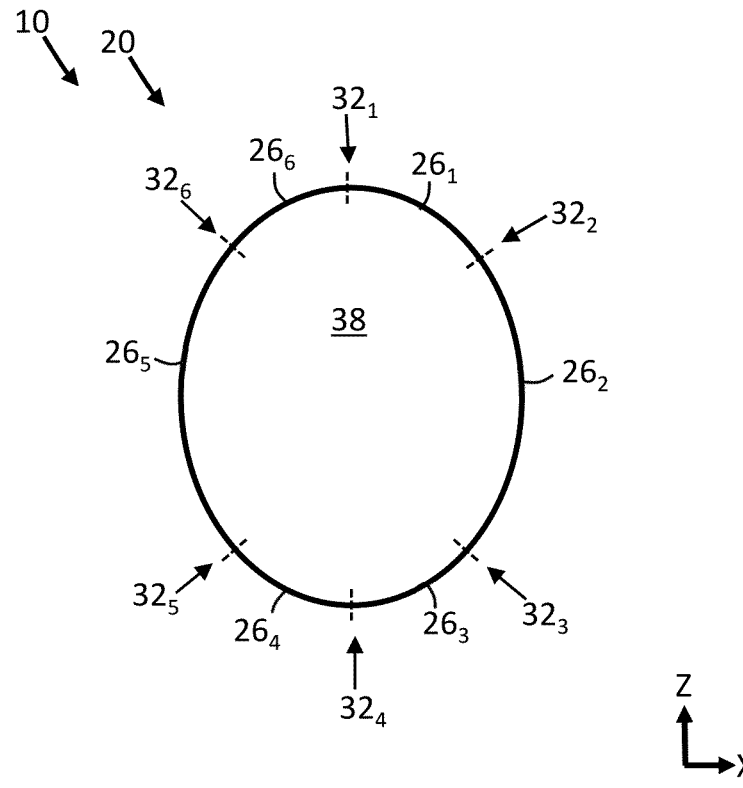
FIG. 34 is a schematic cross-sectional view of the shell of FIG. 33.
Figures 38, 39, 40, 41:
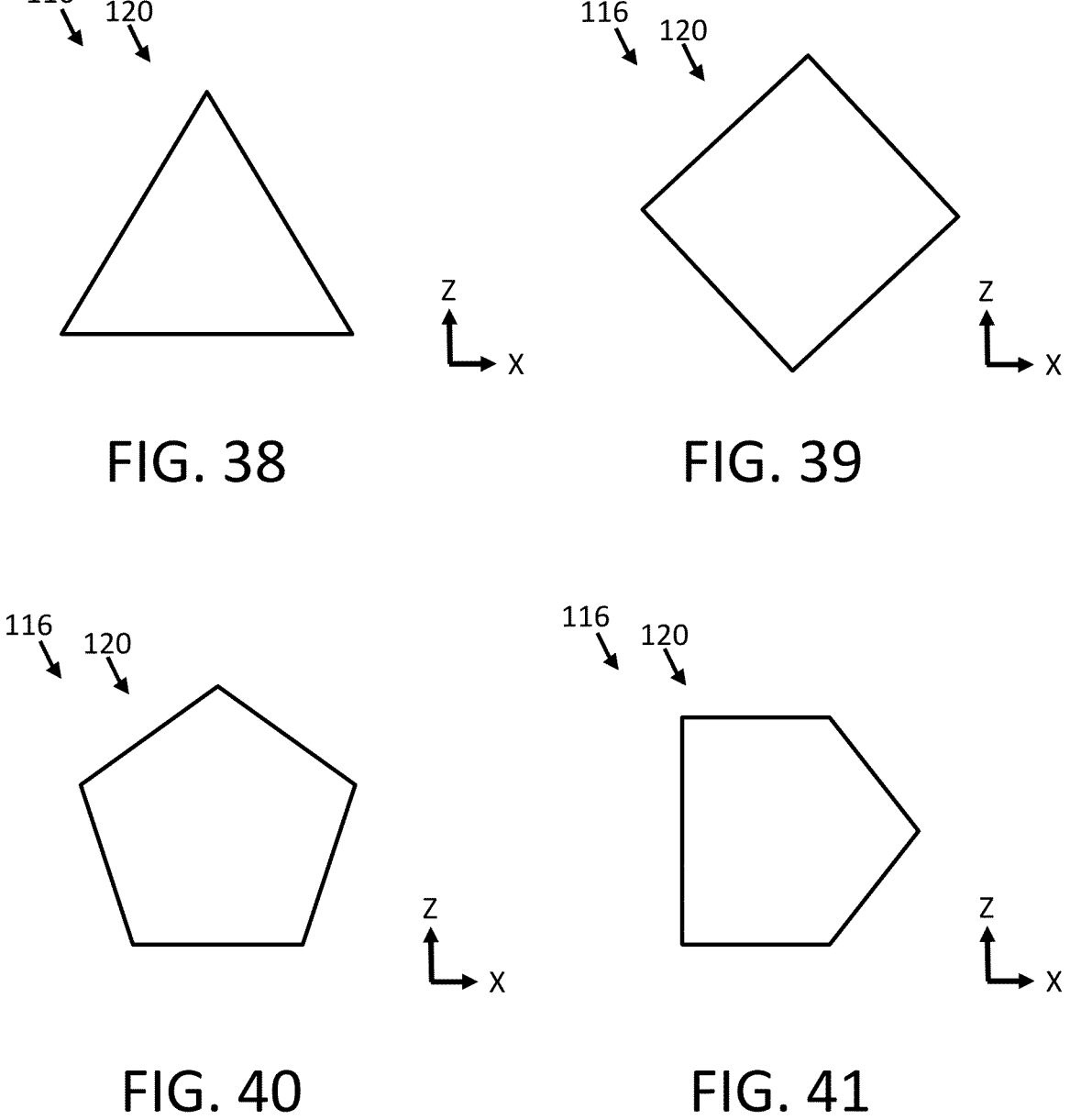
FIGS. 38-41 are schematic cross-sectional views of preforms having triangular (FIG. 38), square (FIG. 39), pentagonal (FIG. 40) and other polygonal shaped outer profiles (FIG. 41) in cross-sections parallel to the preform symmetry axis.

Referring to FIGS. 33 and 34, in embodiments in which the shell 10 has a semi-toroidal or toroidal shape, the shell 10 includes an annular wall 20 that defines an internal cavity 38 with a corresponding semi-toroidal or toroidal shape. The wall 20 is longitudinally segmented so as to include a plurality of annular wall segments $26_i$, each of which is joined to an adjacent wall segment by a respective latitudinal wall weld $32_i$. Referring to FIG. 34, in the illustrated embodiment, the wall 20 includes a top radially outer wall segment $26_1$, a radially outer side wall segment $26_2$, a bottom radially outer wall segment $26_3$, a bottom radially inner wall segment $26_4$, a radially inner side wall segment $26_5$, and a top radially inner wall segment $26_6$. In the illustrated embodiment, the wall 20 defines an oval shape in a cross-section parallel to the symmetry axis 24 of the shell 10. In other embodiments not shown in the drawings, the wall 20 of the semi-toroidal or toroidal shell 10 defines a circular shape or another shape. The semi-toroidal or toroidal shell 10 omits the cap that is included in the semi-ellipsoidal shell 10 (see FIGS. 8 and 9), but otherwise can include the same features as the semi-ellipsoidal shell 10, and can be manufactured using the same or substantially similar techniques.

Referring to FIGS. 35-37, in embodiments in which the multi-conic preform 116 is used to manufacture at least one shell 10 with a semi-toroidal or toroidal shape, the preform 116 includes a multi-conic preform wall 120 that is longitudinally segmented so as to include a plurality of annular preform wall segments 126, each of which is joined to an adjacent preform wall segment by a respective latitudinal preform wall weld 132. Referring to FIGS. 36 and 37, in the illustrated embodiment, the preform wall 120 includes a top radially outer preform wall segment 1261, a radially outer preform side wall segment 1262, a bottom radially outer preform wall segment 1263, a bottom radially inner preform wall segment 1264, a radially inner preform side wall segment 1265, and an top radially inner preform wall segment 1266. In the illustrated embodiment, the preform wall 120 defines a hexagonal shape in a cross-section parallel to the symmetry axis 124 of the preform 116. Referring to FIGS. 38-41, in other embodiments the preform wall 120 has a triangular shape (FIG. 38), a square shape (FIG. 39), a pentagonal shape (FIG. 40) and other polygonal shaped outer profiles (FIG. 40) in a cross-section parallel to the symmetry axis 124 of the preform 116. The preform 116 for manufacturing a semi-toroidal or toroidal shell 10 omits the preform cap 118 (see FIG. 22) but otherwise can include the same or substantially features as a preform for manufacturing a semi-ellipsoidal shell. Moreover, the preform 116 for manufacturing a semi-toroidal or toroidal shell 10 can be assembled using the same or substantially similar techniques as a preform for manufacturing a semi-ellipsoidal shell.

While several embodiments have been disclosed, it will be apparent to those having ordinary skill in the art that aspects of the present invention include many more embodiments. Accordingly, aspects of the present invention are not to be restricted except in light of the attached claims and their equivalents. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. A method for manufacturing a semi-ellipsoidal shell using a multi-conic preform, comprising:
   providing a multi-conic preform having:
     a preform cap;
     a multi-conic preform wall; and
     a first latitudinal preform weld joining the preform cap to the preform wall;
     wherein the preform cap and the preform wall are sheet metal components;
     wherein the preform wall is longitudinally segmented so as to include a plurality of annular preform wall segments; and
     wherein each of the plurality of annular preform wall segments is joined to an adjacent preform wall segment by a respective latitudinal preform wall weld;
   performing a first fluid pressure forming step, during which an inner surface of the preform is exposed to a strengthening pressure that work hardens at least the preform cap and the preform wall;
   performing a second fluid pressure forming step, during which the inner surface of the preform is exposed to a design pressure that causes the preform to plastically deform and bulge so as to form the semi-ellipsoidal shell; and
   between the first and second fluid pressure forming steps, at least partially reducing the pressure applied to the inner surface of the preform.

2. A method for manufacturing a semi-ellipsoidal shell using a multi-conic preform, comprising:
   providing a multi-conic preform having:
     a preform cap;
     a multi-conic preform wall; and
     a first latitudinal preform weld joining the preform cap to the preform wall;
     wherein the preform cap and the preform wall are sheet metal components;

wherein the preform wall is longitudinally segmented so as to include a plurality of annular preform wall segments; and wherein each of the plurality of annular preform wall segments is joined to an adjacent preform wall segment by a respective latitudinal preform wall weld;

performing a first fluid pressure forming step, during which an inner surface of the preform is exposed to a strengthening pressure that work hardens at least the preform cap and the preform wall;

performing a second fluid pressure forming step, during which the inner surface of the preform is exposed to a design pressure that causes the preform to plastically deform and bulge so as to form the semi-ellipsoidal shell;

exposing the preform to cold temperatures during at least one of the first fluid pressure forming step and the second fluid pressure forming step.

3. A method for manufacturing a semi-ellipsoidal shell using a multi-conic preform, comprising:

providing a multi-conic preform having:

a preform cap;

a multi-conic preform wall; and a first latitudinal preform weld joining the preform cap to the preform wall;

wherein the preform cap and the preform wall are sheet metal components;

wherein the preform wall is longitudinally segmented so as to include a plurality of annular preform wall segments; and wherein each of the plurality of annular preform wall segments is joined to an adjacent preform wall segment by a respective latitudinal preform wall weld;

performing a first fluid pressure forming step, during which an inner surface of the preform is exposed to a strengthening pressure that work hardens at least the preform cap and the preform wall;

performing a second fluid pressure forming step, during which the inner surface of the preform is exposed to a design pressure that causes the preform to plastically deform and bulge so as to form the semi-ellipsoidal shell;

wherein the plastic deformation and bulging that occurs during the second pressure fluid pressure forming step causes at least one of the preform cap and the preform wall to form a wrinkle; and wherein the second fluid pressure forming step includes exposing the inner surface of the preform to the design pressure for a predetermined period of time after the wrinkle has formed.

4. A method for assembling a multi-conic preform, the method comprising:

providing first and second preform wall segments, each in the form of a frustoconical sheet metal component, the first preform wall segment having top edge alignment markings disposed relative to a top edge of the first preform wall segment, and the second preform wall segment having bottom edge alignment markings disposed relative to a bottom edge of the second preform wall segment;

positionally fixing the first preform wall segment relative to the second preform wall segment such that the top edge alignment markings of the first preform wall segment are aligned with the bottom edge alignment markings of the second preform wall segment; and joining the top edge of the first preform wall segment to the bottom edge of the second preform wall segment via a first latitudinal weld.

5. The method of claim 4, wherein the positionally fixing step includes connecting the top edge of the first preform wall segment to the bottom edge of the second preform wall segment via a plurality of tack welds.

6. The method of claim 4, wherein the joining step includes joining an entirety of the top edge of the first preform wall segment to the bottom edge of the second preform wall segment via the first latitudinal weld.

7. The method of claim 6, wherein the first latitudinal weld is provided by a laser welder.

8. The method of claim 4, wherein the joining step includes rotating the first and second preform wall segments on a rotary table while a stationary welder provides the first latitudinal weld.

9. The method of claim 4, further comprising: cutting a plurality of preform wall sub-segments from a sheet metal plate; and welding the plurality of preform wall sub-segments together to form the first preform wall segment.

10. The method of claim 9, further comprising: providing the top edge alignment markings at predetermined positions on the sheet metal plate before the step of cutting the plurality of preform wall sub-segments from the sheet metal plate.

11. The method of claim 10, wherein the step of cutting the plurality of preform wall sub-segments from the sheet metal plate and the step of providing the top edge alignment markings at predetermined positions on the sheet metal plate are performed using a same laser cutter.

12. The method of claim 4, wherein each of the top edge alignment markings includes an etching on a radially outer surface of the first preform wall segment and each of the bottom edge alignment markings includes an etching on a radially outer surface of the second preform wall segment.

13. The method of claim 4, wherein each of the top edge alignment markings includes an etching on a radially inner surface of the first preform wall segment and each of the bottom edge alignment markings includes an etching on a radially inner surface of the second preform wall segment.

14. The method of claim 4, wherein the top edge alignment markings and the bottom edge alignment markings extend beyond a heat-affected zone of the first latitudinal weld.

15. The method of claim 4, wherein the step of providing the top edge alignment markings includes depositing the top edge alignment markings at the predetermined positions on the sheet metal plate.

16. The method of claim 15, further comprising grinding the top edge alignment markings after the joining step.

17. The method of claim 4, wherein the first and second preform wall segments are each formed of stainless steel sheet metal.

18. The method of claim 4, wherein the first preform wall segment is formed of stainless steel sheet metal having a first predetermined hardness, the second preform wall segment is formed of stainless steel sheet metal having a second predetermined hardness that is different than the first predetermined hardness.

19. The method of claim 4, wherein the plurality of preform wall sub-segments are identical to one another, including respective positions of the top edge alignment markings thereon.

20. The method of claim 4, wherein the positionally fixing step includes simultaneously applying tack welds at circumferentially spaced locations corresponding to aligned top edge alignment markings and bottom edge alignment markings.

21. The method of claim 4, wherein the top edge alignment markings are provided by a laser etching step performed using a laser cutter at a first laser power setting and the cutting step is performed using the laser cutter at a second laser power setting greater than the first laser power setting.

22. The method of claim 4, wherein the top edge alignment markings define predetermined circumferential spacing such that alignment positions lie in a plane perpendicular to a semi-axis of the multi-conic preform.

* * * * *